(12) United States Patent
Carbune et al.

(10) Patent No.: US 12,202,125 B2
(45) Date of Patent: Jan. 21, 2025

(54) ROBOTIC COMPUTING DEVICE WITH ADAPTIVE USER-INTERACTION

(71) Applicant: GOOGLE LLC, Mountain View, CA (US)

(72) Inventors: Victor Carbune, Zurich (CH); Matthew Sharifi, Kilchberg (CH)

(73) Assignee: GOOGLE LLC, Mountain View, CA (US)

( * ) Notice: Subject to any disclaimer, the term of this patent is extended or adjusted under 35 U.S.C. 154(b) by 462 days.

(21) Appl. No.: 17/533,873

(22) Filed: Nov. 23, 2021

(65) Prior Publication Data

US 2023/0158683 A1 May 25, 2023

Related U.S. Application Data

(60) Provisional application No. 63/281,375, filed on Nov. 19, 2021.

(51) Int. Cl.
  *B25J 13/00* (2006.01)
  *B25J 9/00* (2006.01)
  (Continued)

(52) U.S. Cl.
  CPC .......... *B25J 13/003* (2013.01); *B25J 9/0003* (2013.01); *B25J 9/161* (2013.01); *B25J 9/162* (2013.01);
  (Continued)

(58) Field of Classification Search
  CPC ........ B25J 13/003; B25J 9/0003; B25J 9/161; B25J 9/162; B25J 9/1653; B25J 9/1664; B25J 11/0005
  See application file for complete search history.

(56) References Cited

U.S. PATENT DOCUMENTS 9,205,886 B1   12/2015 Hickman et al.
11,241,791 B1 *  2/2022 Ebrahimi Afrouzi .. G01C 22/02
          (Continued)

FOREIGN PATENT DOCUMENTS

EP        3637694         4/2020

OTHER PUBLICATIONS

European Patent Office; International Search Report and Written Opinion issued in Application No. PCT/US2021/063125; 17 pages; dated Sep. 23, 2022.
(Continued)

*Primary Examiner* — Basil T. Jos
*Assistant Examiner* — Jay Khandpur
(74) *Attorney, Agent, or Firm* — Gray Ice Higdon

(57) ABSTRACT

Implementations set forth herein relate to a robotic computing device that can perform certain operations, such as communicating between users in a common space, according to certain preferences of the users. When interacting with a particular user, the robotic computing device can perform an operation at a preferred location relative to the particular user based on an express or implied preference of that particular user. For instance, certain types of operations can be performed at a first location within a room, and other types of operations can be performed at a second location within the room. When an operation involves following or guiding a user, parameters for driving the robotic computing device can be selected based on preferences of the user and/or a context in which the robotic computing device is interacting with the user (e.g., whether or not the context indicates some amount of urgency).

16 Claims, 9 Drawing Sheets

(51) Int. Cl.
*B25J 9/16* (2006.01)
*B25J 11/00* (2006.01)

(52) U.S. Cl.
CPC ........... *B25J 9/1653* (2013.01); *B25J 9/1664* (2013.01); *B25J 11/0005* (2013.01)

(56) References Cited

U.S. PATENT DOCUMENTS

| | | |
|---|---|---|
| 2014/0324271 A1 | 10/2014 | Oh et al. |
| 2018/0277002 A1* | 9/2018 | Hergenroeder .......... G09B 5/06 |
| 2018/0329617 A1 | 11/2018 | Jones et al. |
| 2021/0260773 A1* | 8/2021 | Cheuvront .............. G06F 16/00 |
| 2022/0353744 A1* | 11/2022 | Shen ...................... H04W 28/20 |
| 2023/0033102 A1* | 2/2023 | Gorski ............... G06Q 30/0609 |

OTHER PUBLICATIONS

European Patent Office; Invitation to Pay Additional Fees issued in Application No. PCT/US2021/063125; 11 pages; dated Aug. 2, 2022.

* cited by examiner

ROBOTIC COMPUTING DEVICE WITH ADAPTIVE USER-INTERACTION

BACKGROUND

As computing devices facilitate interactions between automated assistants and users, most computing devices cannot autonomously navigate to various destinations without being manually controlled by a user. This can limit the ability of some automated assistants to provide help with certain tasks that may involve navigating toward and/or away from a user. For instance, a user that tasks their automated assistant to render certain audio content can be limited in the locations from which the user can perceive the audio content. This can result from the audio content being rendered via a standalone speaker device and/or other computing device that must be manually positioned by the user—oftentimes near an electrical outlet.

In some instances, when a user requests that an automated assistant perform a particular action that may require movement between geographic locations (e.g., between different rooms within a house), certain tasks may be delegated to a device that is capable of performing the action. However, oftentimes such devices may not be able to handle any variety of actions. For example, an autonomous vacuum may be able to initiate a default vacuuming operation at the request of an automated assistant, but may not be able to perform other vacuuming-related operations with any specificity. This can be the result of the automated assistant and/or the autonomous vacuum having no mechanism for translating the requests submitted by the user to the automated assistant. This can be particularly inefficient when a robotic home device has a number of interfaces (e.g., speakers, sensors, etc.) that may be necessary to fulfill specific assistant requests, but the robotic home device has no mechanism for translating them into executable operations that can be performed by the robotic home device.

SUMMARY

Implementations set forth herein relate to a robotic device that can perform a variety of tasks that can involve the robotic device navigating to a user for a particular purpose and/or communicating certain information between users. For example, the robotic device can operate in a home of a user and receive, from the user, a spoken utterance such as, "Robot, ask Eli if he is ready for school." In this circumstance, the user can be a father of the person, "Eli," who is the subject of the query from the user. In response to the spoken utterance, and with prior permission from person(s) in the home, the robotic device can navigate from a living room where the robotic device and user are initially located and maneuver towards a room of Eli. In some implementations, the robotic device can determine a probable location of Eli by accessing data that can correlate certain locations in the home to certain titles (e.g., "Eli's Room"). Alternatively, or additionally, the robotic device can determine a probable location of Eli based on prior interactions between the robotic device and Eli. For example, the other user, Eli, may have been located in an office area of the home during a most recent interaction between the robotic device and Eli. Based on this determination, and in response to the spoken utterance from the father, the robotic device can navigate to the office area of the home to find Eli, the other user.

In some implementations, the robotic computing device can determine a probable location of the other user, "Eli," by accessing interaction data that can indicate where the other user has recently interacted with another device. For example, just before the user provides the aforementioned spoken utterance, the other user may have interacted with a standalone display device in a kitchen of the home of the user. Home graph data can provide a correlation to the standalone display device and the kitchen of the home, at least based on the standalone display device having a label, in the home graph data, such as, "Kitchen Display." Alternatively, or additionally, a semantic label for a room can be inferred from features of a room, such as, for example, a room being labeled as a "kitchen" based on this room being the only room in the house with a dishwasher appliance and a microwave (e.g., as determined using one or more sensors and one or more object recognition techniques). In some implementations, the robotic computing device or the standalone display device can determine that this prior interaction involved the other user, Eli, using one or more user verification techniques (e.g., voice verification, facial recognition, etc.). Therefore, using this data, the robotic computing device can determine that the other user recently interacted with a particular device (e.g., the kitchen display) and that the particular device is located in a kitchen of the home. Based on this determination, the robotic computing device can respond to the aforementioned spoken utterance from the user by navigating towards the kitchen of the home, in furtherance of initiating a dialogue with the other user, Eli.

When the robotic device has identified the location of the other user that is the subject of the spoken utterance, the robotic device can, with prior permission from the other user, issue an output via an output interface (e.g., display interface, audio interface, etc.) of the robotic device. For instance, the output issued to the other user can be a cordial audio output such as, "Hi Eli, your father kindly wants to know if you are ready for school." When the robotic device has issued the audio output and/or has identified the location of Eli, the robotic device can activate one or more input interfaces for receiving an input from Eli. For example, Eli may have overheard the user ask the robotic device to inquire whether Eli is ready for school and, as a result, may provide a responsive input to the robotic device before the robotic device has a chance to render the audio output. In such circumstances, the robotic device would be able to capture the input from Eli because one or more microphones of the robotic device would be preemptively activated before arriving at the location of the other user. Otherwise, when the other user, Eli, provides the input after the robotic device renders the audible output, the other user can provide a responsive input such as, "Tell him, 'I'm almost already.'"

When the robotic device has received a responsive input from the other user, the robotic device can cause the responsive input to be processed and also begin navigating back to the user who provided the initial spoken utterance. In some implementations, the robotic device can have access to a speech processing module, which can process audio data and/or textual data using one or more trained machine learning models. For example, the one or more trained machine learning models can include a transformer neural network and/or other language model that can be employed to convert the responsive input into a meaningful output. For instance, the robotic device can cause audio input data corresponding to the spoken utterance from the user and/or another spoken utterance from the other user to generate audio output data. The audio output data can characterize a cordial natural language output such as, "Eli has kindly indicated that he is almost ready to go." In this way, a more natural type of dialogue can be created between the robotic device and each user, as opposed to exclusively providing verbatim recitations of what the responding user may have stated. This can allow for more intelligible interactions between users and their robotic devices, and reduce instances in which a robotic device is asked to repeat what another user may have stated to the robotic device. Certain resources, such as battery life and processing bandwidth, can be preserved as a result.

In some implementations, the robotic computing device can assist the user with identifying a particular device and/or location of a particular device in circumstances in which the user may not have expressly solicited the robotic computing device to find the particular device. In some instances, the robotic computing device can perform such operations when the particular device is rendering a notification that the user may not have acknowledged because they are not close enough to the particular device and/or the device is operating in a silent mode. For example, a cellular phone in a home of the user can be operating in a silent mode when the cellular phone receives an incoming phone call. Although the cellular phone may vibrate in the silent mode, the user may not be able to determine that the cellular phone is vibrating when the user and the cellular phone are in different rooms. However, the robotic computing device can receive a notification, via a local area network (e.g., Wi-Fi) and with prior permission from the user, that the cellular phone is receiving an incoming call.

In response to receiving the notification, the robotic computing device can render an output such as, "Sir, your phone is ringing on silent." This output can be rendered when the robotic computing device is located within a threshold distance of the user and/or after the robotic computing device navigates toward the user in response to the notification. When the user hears the output from the robotic computing device, the user can respond with a spoken utterance such as, "Oh thanks, I thought my phone was right here." This spoken utterance can be captured by the robotic computing device via an audio interface of the robotic computing device can converted to audio data, which can be processed at the robotic computing device and/or another particular computing device (e.g., a network device such as a server) with prior permission from the user. The audio data can be processed to determine a willingness of the user to be assisted by the robotic computing device—despite not having explicitly requested the assistance of the robotic computing device.

For example, audio data and/or other data can be processed using one or more heuristic processes and/or one or more trained machine learning models (e.g., a transformer neural network model, convolutional neural network, recurrent neural network, and/or other model. In some implementations, the robotic computing device can employ a neural network based sequence classification model to determine whether, with prior permission from the user, the user exhibited an inquiring tone and/or some amount of uncertainty. For example, the audio data can be processed to generate a metric for an amount of uncertainty the user may be exhibiting with respect to subject matter embodied in their spoken utterance and/or an output from the robotic computing device. When the metric satisfies a particular metric threshold, the audio data can be further processed to determine information and/or identify operations that may assist the user with resolving their uncertainty and/or inquiry. For example, an operation of identifying the location of the cellular phone can be determined by the robotic computing device to be useful for resolving the detected uncertainty of the user.

Based on this determination, the robotic computing device can offer to execute the operation by rendering another output such as, "If you'd like, I can take you to your phone." In some implementations, the user can agree to allow the robotic computing device to take the user to the cellular phone by providing an explicit response input such as, "Sure." Alternatively, or additionally, the user can provide their approval for the robotic computing device to take the user to the cellular phone by exhibiting body language and/or other features that indicate a willingness for the user to be directed to the cellular phone by the robotic computing device. For example, in response to the robotic computing device providing the other output, the user can get up from where they were sitting and walk towards the robotic computing device. In some implementations, audio data and/or image data captured by the robotic computing device with prior permission from the user can be processed to determine whether the user is exhibiting a positive and/or approving response to the offer from the robotic computing device (i.e., the other output). In some implementations, the audio data and/or image data can be processed using one or more of the same, or different, trained machine learning models that were used to process the spoken utterance from the user. For instance, multiple images captured, with prior permission from the user, when the user is getting up from their seat can be processed to determine that the trajectory of the user is towards the robotic computing device. Based on this determination, the robotic computing device can conclude that the user has exhibited a willingness to be directed to the cellular phone by the robotic computing device.

In some implementations, a speed or an acceleration of the robotic computing device and/or urgency with which the robotic computing device reacts can be based on one or more features of a context in which the robotic computing device has initialized a maneuver. For example, a type of notification that is received by the robotic computing device from another computing device can indicate an urgency of the notification, and therefore provide a basis for a speed at which the robotic computing device travels. For instance, the robotic computing device can operate according to a first speed when the robotic computing device is attempting to find a cellular phone that is ringing. However, the robotic computing device can operate according to a second speed, that is lower than the first speed, when the robotic computing device is attempting to find the cellular phone in response to an incoming text message. Alternatively, or additionally, the robotic computing device can establish a speed for maneuvering to a particular location based on one or more different factors such as: an urgency detecting in a voice of the user, content of a particular notification, a source of a particular notification (e.g., the robotic computing device may maneuver faster when a spouse has sent a text message compared to when an acquaintance has sent a text message), a time of day when a notification is received, an application that is the source of the notification (e.g., the robotic computing device may maneuver faster when a delivery notification is received from a shopping application compared to a social media application providing a notification), and/or any other source of data that can be a basis for the robotic computing device to maneuver to a different location.

In some implementations, the robotic computing device can maneuver to particular locations within a particular room depending on the operation being performed by the robotic computing device and/or one or more features of a context in which the robotic computing device is performing the operation. For example, a user that is preparing dinner for guests can solicit the robotic computing device to play music in a kitchen of a home of the user. In response to expressly soliciting the robotic computing device (e.g., by providing a spoken utterance such as "Play some music."), the robotic computing device can maneuver to a particular location in a living room of the home for playing music when guests are in the home. In some implementations, this particular location can be learned by the robotic computing device and/or expressly identified by the user (e.g., "When guests are here, play music at this particular location in the living room.").

Moreover, in various implementations this particular location can be specific to the operation being performed. For example, when executing a "playing music" operation, the robotic computing device can maneuver to a first location in the room; when executing a "read me the news" operation, the robotic computing device can maneuver to a distinct second location in the room; and when executing a "stream video from a smart camera" operation, the robotic computing device can maneuver to a further distinct third location in the room. In some implementations, the user can specify a location within a room for performing an operation, or type of operations, by providing a descriptive natural language input (e.g., "Whenever you play videos, play them 1 meter in front of the north side of the couch."). Alternatively, or additionally, the user can specify a location within a room for performing an operation, or type of operations, by relocating themselves to the desired location (e.g., "Whenever you tell me the news, tell me the news right here [user walks over to desired location and stands there]."). The robotic computing device can then capture image data (and/or other sensor data), with prior permission from the user, and process the image data to determine coordinates of, and/or inferred semantic label for, where the user is standing and/or facing. Alternatively, or additionally, the user can specify a location within a room for performing an operation, or type of operations, by interacting with a graphical user interface (GUI) of the robotic computing device or a separate device. For example, a first user can interact with a GUI to annotate a map of their home to specify where certain types of operations (e.g., audibly rendering the news) should be performed. In some implementations, the map can be a graphical representation of a home or other structure, with semantic labels that are generated by processing data from one or more sensors of the robotic computing device. Alternatively, or additionally, a second user can also interact with an instance of the GUI to specify where certain other types of operations (e.g., facilitating video calls) should be performed.

In various implementations, preferences regarding locations for the robotic computing device to perform certain operations, and/or types of operations, can be stored as user-specific preferences. For example, a first user can direct the robotic computing device to perform music types of operations in a first location of a living room in a home, and a second user can direct the robotic computing device to perform music types of operations in a second location, that is different than the first location, in the living room. Therefore, in response to the first user requesting that the robotic computing device "play music in the living room," the robotic computing device can verify that the first user is providing the request, and relocate to the first location within the living room, in accordance with the specified preference of the first user.

For example, prior to the guests arriving, the user can provide instructions for the robotic computing device to stay in the living room when performing any audio and/or video rendering. The user can provide these instructions via a spoken utterance such as, "Please only play music, there, next to the couch, when the guests arrive." The user can optionally point to the location (e.g., when uttering " . . . there . . . "), and the robotic computing device can capture image data of the user pointing (with prior permission from the user) to determine the precise location the user is referring to. For example, geographic layout data characterizing the home of the user can be compared to an estimated trajectory of the "pointing" finger of the user in order to determine the preferred "music" location that the user is referring to. Alternatively, or additionally, the user can interact with a GUI to annotate a map of their home to specify where the user would prefer certain types of operations to be performed. Thereafter, before the guests arrive, the robotic computing device may follow the user around the home (with or without playing music) as the user prepares for the guests' arrival. When the guests arrive, the robotic computing device can either maneuver to a location adjacent to the couch in the living room and play music, or wait for the user to expressly request that the robotic computing device play music (e.g., "Play some music.").

In some implementations, this request from the user can be processed to generate preference data, which can be utilized when responding to subsequent requests from the user. For instance, when the user has different guests over the following weekend, the user can respond to a request to play music by maneuvering to a location that is adjacent to the couch in their living room. In some implementations, user verification can be performed by the robotic computing device before implementing certain preferences for certain operations. For example, voice verification and/or facial recognition can be performed in response to a user requesting to play music. When the requesting user does not correspond to any user with a particular location preference for playing music, the robotic computing device can select a location based on one or more heuristic processes and/or one or more trained machine learning models. For example, a user that has not provided express preferences for locations for certain operations may have certain preferences inferred based on prior interactions between the user and the robotic computing device.

In some implementations, a location of the robotic computing device can be dynamic for certain operations and/or for certain preferences of the user. For example, the user can provide a request for the robotic computing device to issue an alarm after a certain duration of time (e.g., 10 minutes). In response, the robotic computing device may not initially follow the user, but may initialize a "trailing" operation after the duration of time before the alarm reaches a particular value. In some implementations, this particular value can be based on the alarm request, a reason for the requested alarm, an estimated relative location of the user relative to the robotic computing device, and/or one or more features of a context in which the user requested the alarm. In some implementations, the user can provide a request to the robotic computing device that can cause the robotic computing device to trail (e.g., follow) the user without the user having expressly requested the robotic computing device to follow the user. This behavior can be learned over time through interactions with the robotic computing device and/or learned based on express requests from the user. For example, the user can expressly request that the robotic computing device trail the user in some circumstances, or stop trailing the user in other circumstances. Such instances can provide feedback data that can be utilized to train the robotic computing device to trail, and/or not trail, the user in certain circumstances without the user expressly providing a request to have the robotic computing device trail the user.

For example, the user can request that the robotic computing device play music and, in response, the robotic computing device can initialize a trailing operation and music rendering operation. In some implementations, the trailing operation can be initialized in certain contexts when the user is determined to not have another audio device nearby and/or is determined to not be walking toward an audio device. For example, when the user is walking down a hallway and provides a spoken utterance such as, "Play some music," the robotic computing device can determine that the hallway does not have an audio device present. Alternatively, or additionally, the robotic computing device can determine that the user is walking down the hallway in a direction of a room that does not have an audio device. In response to the spoken utterance, the robotic computing device can initialize rendering of music and also initialize a trailing operation, such that the user can hear the music while they are walking down the hallway and into the room. Otherwise, when the room is determined to have an audio device, the robotic computing device can initialize playing music while the user is in the hallway, but delegate playing music to the audio device in the room, once the user enters the room. Thereafter, when the user is in the room, the robotic computing device can optionally remain outside of the room and cease the trailing operation, at least according to a determined preference of the user.

In some implementations, features of a trailing operation can depend on an action being performed, and/or a type of action being performed, by the robotic computing device, and/or a particular user that is providing the request for the robotic computing device to perform the action. For example, a robotic computing device can trail a user by a distance "x" when performing an operation of playing music, but trail the user at a different distance "y" when facilitating a video call or audio call. Alternatively, or additionally, the robotic computing device can trail the user at a particular velocity according to a preference of the particular user and/or the action, or type of action, being performed. In some implementations, features of a trailing operation can be based on where the robotic computing device is located and/or whether the robotic computing device is located in a room having a particular inferred semantic label. For example, the robotic computing device can perform a trailing operation according to a distance and/or velocity when in a "Kitchen" but a different distance and different velocity when in a "Garage."

The above description is provided as an overview of some implementations of the present disclosure. Further description of those implementations, and other implementations, are described in more detail below.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1A:
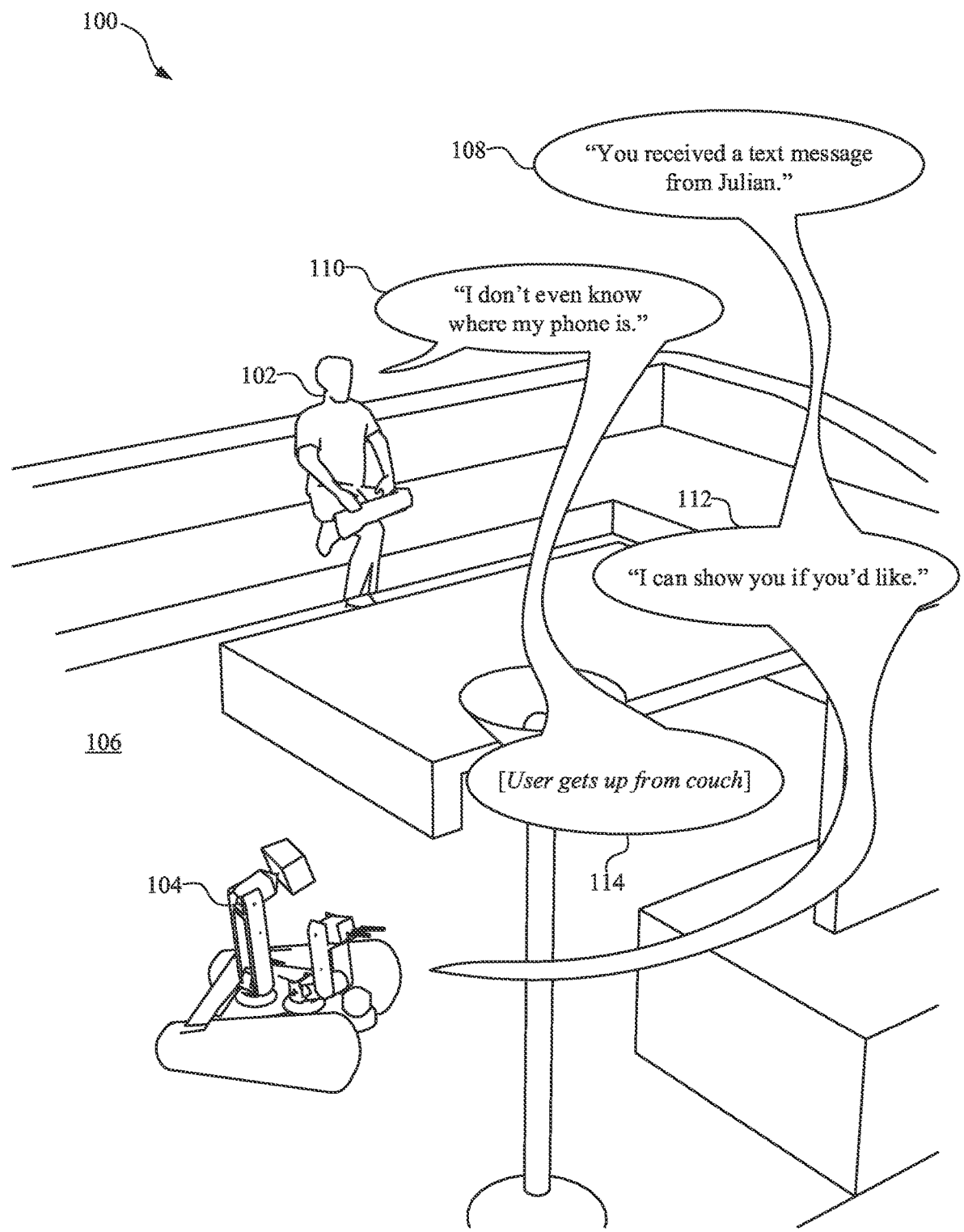
FIG. 1A and FIG. 1B illustrate views of a user interacting with a robotic computing device that can infer, without express solicitation, whether a user would like to be directed to a device that is providing a notification.
Figure 1B:
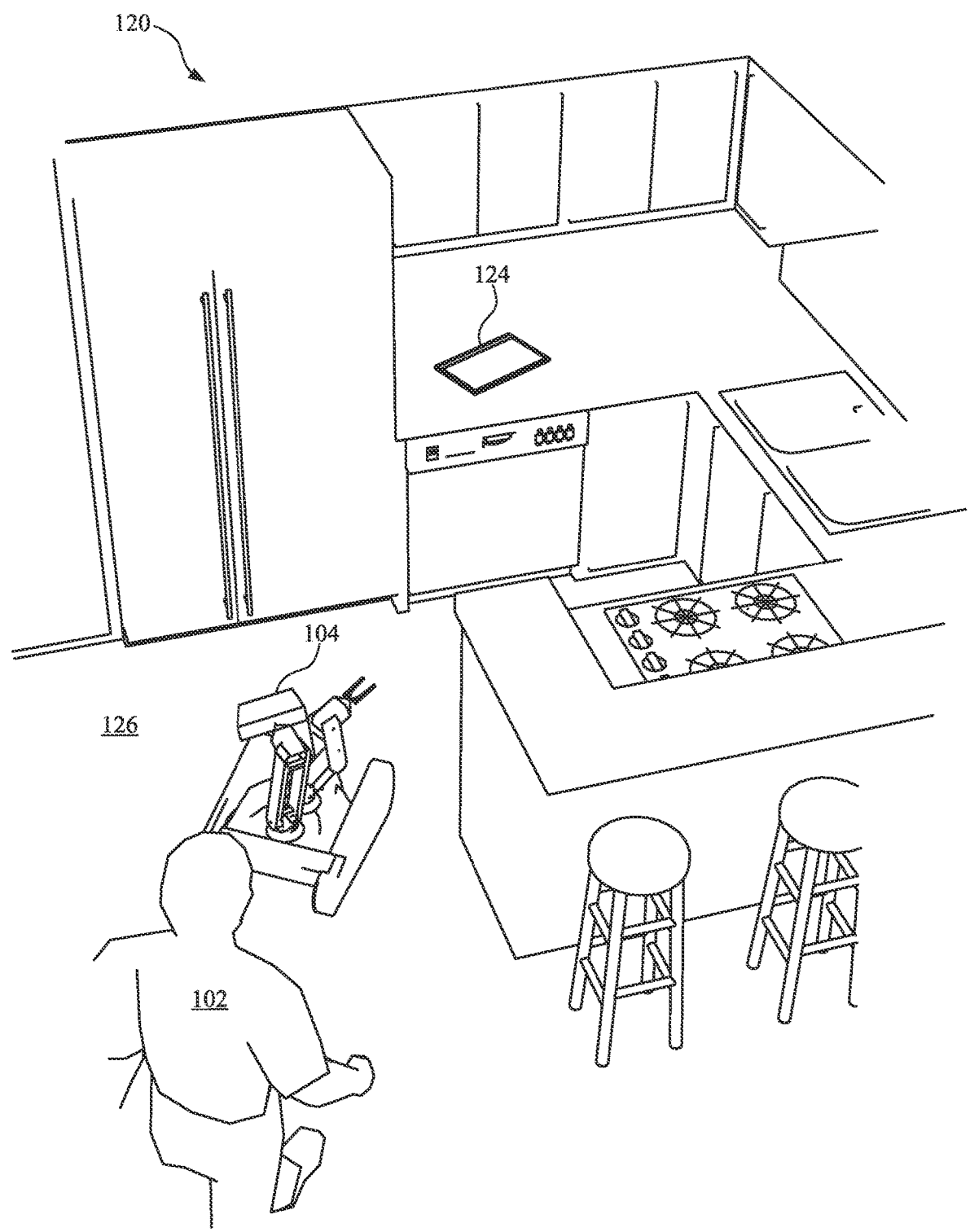

FIG. 1A and FIG. 1B illustrate a view 100 and a view 120 of a user 102 interacting with a robotic computing device 104 that can infer whether a user would like to be directed to a device that is providing a notification. Alternatively, or additionally, the robotic computing device can maneuver to the device and/or a particular location according to driving operation parameters that are selected based on one or more features of a context in which the notification is being provided. For example, the robotic computing device 104 can determine that the user 102 has received a text message at a separate device, such as a cellular phone, when the cellular phone is operating in a silent mode (e.g., a vibrate only mode). Each of the cellular phone and the robotic computing device 104 can access a local area network, which can be wirelessly accessible to the robotic computing device 104 in a room 106 of the user 102. In some implementations, and with prior permission from the user 102, the robotic computing device 104 can determine whether the user 102 has acknowledged the text message and/or whether the user 102 is located in an area in which the user 102 could detect receipt of the text message. When the robotic computing device 104 predicts that the user 102 has not acknowledged the text message and/or is not located in an area in which detection of the text message is possible, the robotic computing device 104 can render an audible output 108 such as, "You received a text message from Julian." Alternatively, or additionally, the robotic computing device 104 can proactively render the audible output 108 when the cellular phone receives the text message.

In some implementations, the robotic computing device 104 can, with prior permission from the user 102, generate a prediction regarding whether the user 102 is aware of where the cellular phone is located. The prediction can be based on, for example, a spoken utterance 110 that indicates the user 102 is not aware of the location of the cellular phone. The spoken utterance 110 can include content such as, "I don't even know where my phone is." Alternatively, or additionally, image data and/or audio data can be processed to determine, with prior permission from the user 102, whether the user 102 knows where the cellular phone is. For example, in response to the audible output 108, the user 102 can look around for their cellular phone (e.g., look to their left and to their right), which can be an indication that they are unaware of where their cellular phone is located. Based on one or more of these contextual features, the robotic computing device 104 can determine that the user 102 is unaware of where their cellular phone is located and provide another audible output 112 such as, "I can show you if you'd like."

In some implementations, the robotic computing device 104 can infer that the user is interested in being directed to their cellular phone without the user 102 providing an input that expressly directs the robotic computing device 104 to lead them to the cellular phone. For example, a feature 114 of the context can include the user 102 getting up from their seat after the other audible output from the robotic computing device 104. This feature 114 can be a positive indication that the user 102 is willing to be directed to their cellular phone by the robotic computing device 104. For example, and as illustrated in view 120 of FIG. 1B, the robotic computing device 104 can leave the room 106 and enter another room 126 in furtherance of directing the user 102 to a device 124, such as their cellular phone. In this way, the user 102 does not necessarily have to engage in express conversations with their assistant devices to achieve certain benefits. This can preserve computational resources of the robotic computing device 104 and/or other devices, as less processing and storage may be consumed before initializing performance of an operation.

Figure 2A:
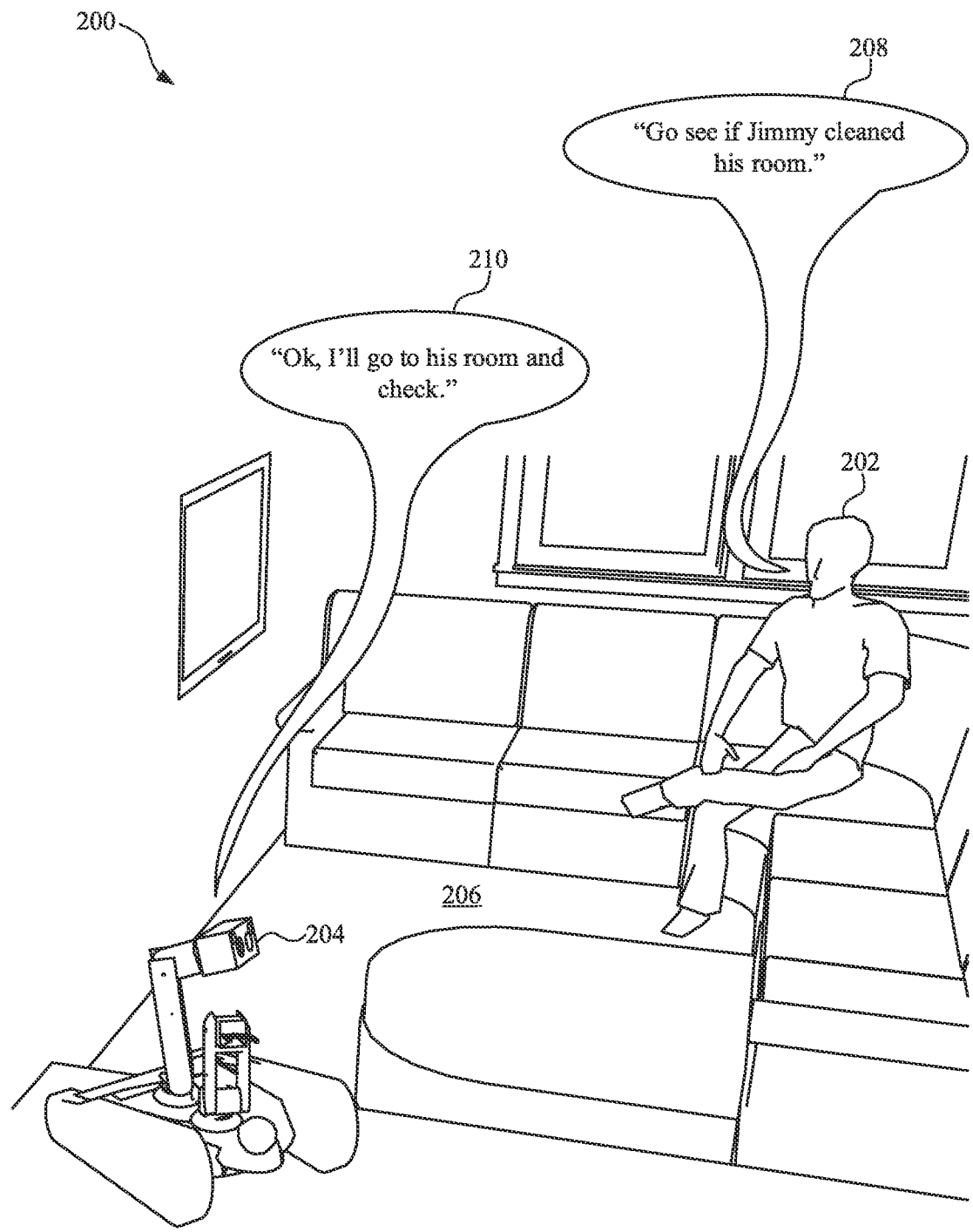
FIG. 2A, FIG. 2B, and FIG. 2C illustrate views of a user interacting with a robotic computing device that can communicate between users and interact with users at learned, preferred locations.
Figure 2B:
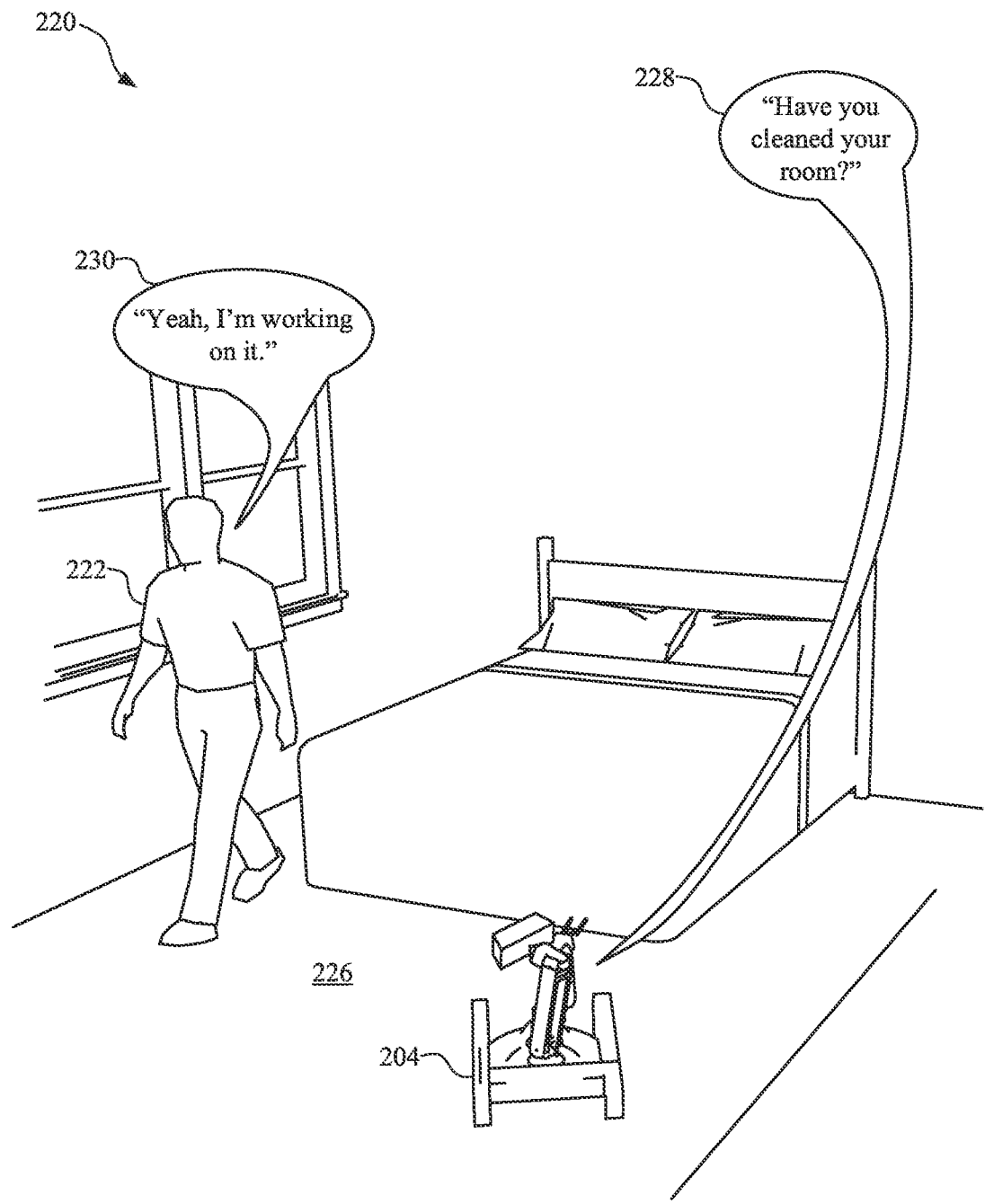
Figure 2C:

FIG. 2A, FIG. 2B, and FIG. 2C illustrate a view 200, a view 220, and a view 240 of a user 202 interacting with a robotic computing device 204 that can communicate between users and interact with users at learned, preferred locations. For example, a user 202 can provide a spoken utterance 208 such as, "Go see if Jimmy cleaned his room." The spoken utterance can be directed to the robotic computing device 204, which can be located in a room 206 with the user 202. In response to detecting the spoken utterance 208, the robotic computing device 204 can render an audible output 210 such as, "Ok, I'll go to his room and check." In some implementations, the robotic computing device 204 can determine that the spoken utterance 208 embodies one or more requests for the robotic computing device 204 to perform one or more operations. The one or more operations can include determining a location for "Jimmy's" room and determining whether the room is "cleaned."

In some implementations, robotic computing device 204 can determine the location of Jimmy's room by communicating with other computing devices that are located within a threshold distance of the robotic computing device 204 and/or that are connected to a common network with the robotic computing device 204. For example, in response to determining the requested operations, the robotic computing device 204 can cause one or more devices in the room 206 and out of the room 206 to render one or more different types of outputs (e.g., visual, audio, antenna, etc.) that can be detected by the robotic computing device 204. The robotic computing device 204 can determine, based on these outputs, that one or more of the devices correspond to "Jimmy's" room. Alternatively, or additionally, the robotic computing device 204 can determine a relative distance of the robotic computing device 204 from one or more smart devices based on one or more signal metrics (e.g., signal quality), optionally detected within a temporal window or duration of time. In some implementations, a user-specified name for a particular device can be "Jimmy's speaker," and/or "Jimmy's smart light," and can therefore provide evidence that a location of the particular device corresponds to Jimmy's room. Alternatively, or additionally, one or more signal metrics associated with a communication between the particular device and the robotic computing device 204 can indicate a relative distance and/or relative location of the particular device from the robotic computing device 204.

In some implementations, such labels for devices can be identified via a smart home graph that is accessible to the robotic computing device 204, an assistant application, and/or any other application or module that can be associated with the user 202. Alternatively, or additionally, the robotic computing device 204 can determine, with prior permission from one or more users, a particular room that Jimmy has been previously located in and/or is currently located in. For example, historical interaction data accessible to the robotic computing device 204 can indicate that a majority of interactions between the robotic computing device 204 and the other user (i.e., Jimmy) occurred in another room 226, as illustrated in FIG. 2B. Based on this determination, and a lack of conflicting data (e.g., data indicating that the room 226 is not Jimmy's room), the robotic computing device 204 can navigate to the room 226 for fulfilling the requests from the user 202.

When the robotic computing device 204 arrives in the other room 226, the robotic computing device 204 can gather data about the other room 226 using one or more interfaces of the robotic computing device 204 and/or interacting with one or more other devices within the other room 226. For example, the robotic computing device 204 can utilize one or more cameras to capture one or more images of the other room 226. The one or more images can be processed using one or more trained machine learning models to determine whether the other room 226 should be classified as "clean." In some implementations, the robotic computing device 204 can position itself in the other room 226 based on a preference of the user 202 and/or the other user 222. For example, a first location preference for the robotic computing device 204 within the other room 226 can correspond to a location in which the robotic computing device 204 should be positioned for collecting data. Alternatively, or additionally, a second location preference for the robotic computing device 204 within the other room 226 can correspond to another location in which the robotic computing device 204 should be positioned for interacting with the other user 222.

In some implementations, the robotic computing device 204 can infer location preferences based on a frequency by which a user engages with the robotic computing device 204 at certain locations within a room. Alternatively, or additionally, the robotic computing device 204 can determine a location preference of a user based on express instructions from the user. For example, the user can provide an express request for the robotic computing device 204 to facilitate visual outputs and/or video calls only at certain preferred distances and/or at a particular portion of a room. Alternatively, or additionally, the user can provide an express request for the robotic computing device 204 to facilitate audio outputs and/or phone calls only at other distances and/or another area of a room. These instructions can be received and generated into preference data, which can be utilized by the robotic computing device 204 when subsequently interacting with one or more users.

In accordance with the aforementioned example, the robotic computing device 204 can enter the other room 226 and optionally render an output 228 for the other user 228 in furtherance of fulfilling the request(s) from the user 202. For example, the other output 228 can be, "Have you cleaned your room?" which can be a solicitation for information that can assist the robotic computing device 204 with fulfilling the request(s) from the user 202. In response, the other user 222 (i.e., Jimmy) can provide a spoken utterance 230 such as, "Yeah I'm working on it." This information can optionally be utilized in combination with other data generated by the robotic computing device 204 for fulfilling the request from the user 202. For instance, upon receiving this information and/or data, the robotic computing device 204 can navigate to the user 202, as illustrated in FIG. 2C.

In some implementations, the robotic computing device 204 can navigate to a particular location 246 within the room 206 based on a preference of the user 202. For example, the user 202 can prefer that when the robotic computing device 204 is entering the room 206 to provide an audible response, the robotic computing device 204 should provide the response at the particular location 246. Alternatively, or additionally, the user 202 can have a history of directing the robotic computing device 204 to the particular location 246 by providing a fetch command (e.g., "Come over here.") in combination with a pointing gesture (e.g., a pointing motion toward to the particular location 246). Based on these historical interactions, the robotic computing device 204 can determine that the user 202 would prefer to hear the response from the robotic computing device 204 at the particular location 246 within the room 206. In some implementations, a preferred distance and/or preferred location can vary from room to room, and/or for different operations and/or different types of output. For example, the user 202 can prefer that the robotic computing device 204 provide "news" from the end of a bed, when the robotic computing device 204 is in the bedroom of the user 202, but facilitate audio phone calls from a side of the bed when the robotic computing device 204 is in the bedroom of the user 202.

When the robotic computing device 204 arrives at the particular location 246 for fulfilling the request, the robotic computing device 204 can render an audible output 242 such as, "The room looks clean and Jimmy says he's working on it." This audible output 242 can be generated using one or more language models (e.g., recurrent neural network, transformer network model, etc.). In some implementations, the audible output 242 can include content that is different from what the other user 222 provided, but yet conveys a similar conclusion. Alternatively, or additionally, the audible output 242 can include content that is based on a response from the user 222 and data generated using one or more interfaces (e.g., a camera) of the robotic computing device 204. In this way, the rendered content from the robotic computing device 204 can embody natural language content that characterizes the data and information obtained in furtherance of fulfilling the request from the user 202.

Figure 3:
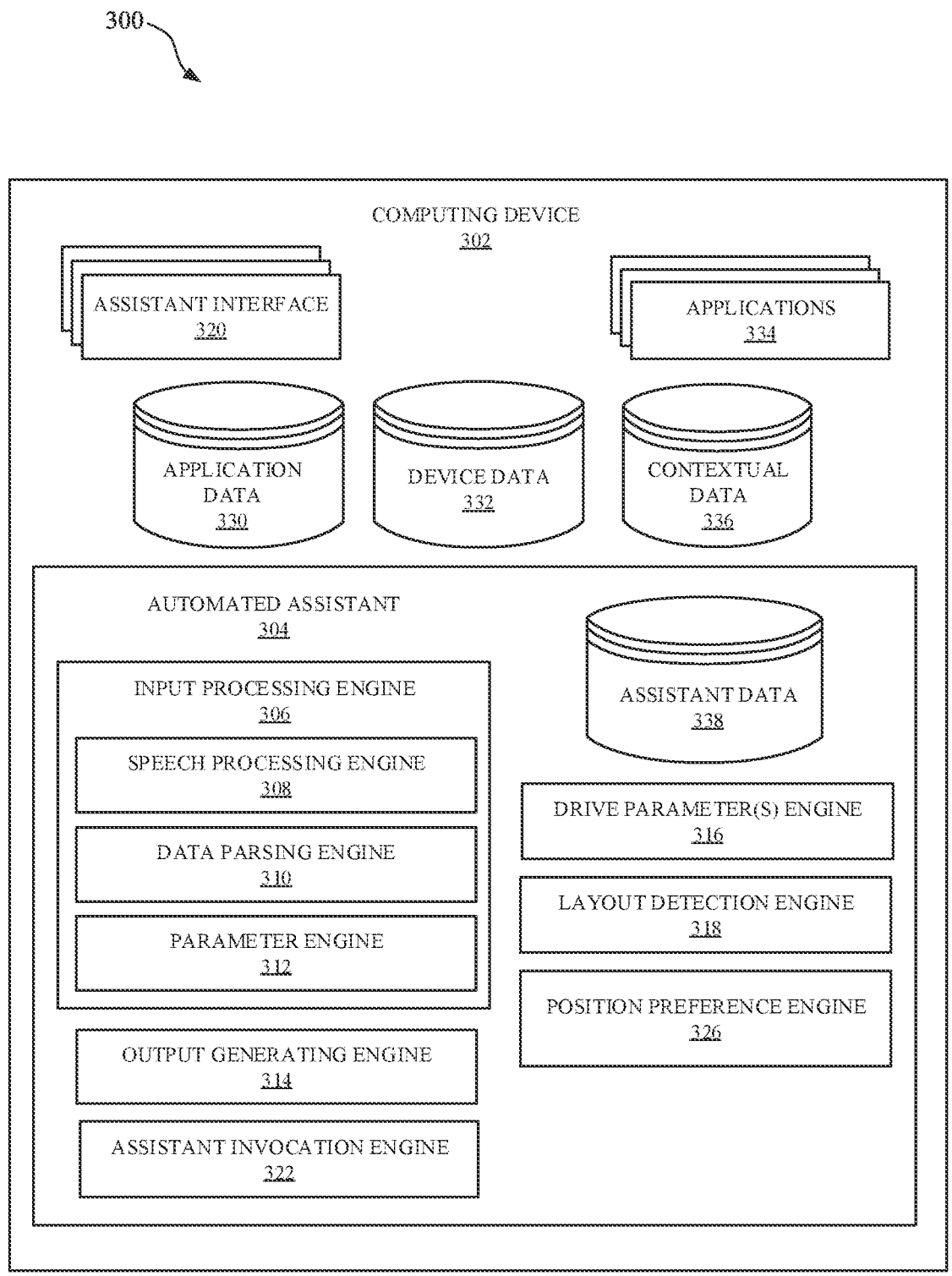
FIG. 3 illustrates a system that operates a robotic computing device to facilitate communications between users, and can travel to particular locations to complete operations without express solicitation from a user.

FIG. 3 illustrates a system 300 that operates a robotic computing device to facilitate communications between users, and can travel to particular locations to complete operations without express solicitation from a user. The system 300 can include a computing device 302, which can be a robotic computing device that includes one or more applications for allowing the robotic computing device to interface with a user. For example, robotic computing device can include an automated assistant 304. The automated assistant 304 can operate as part of an assistant application that is provided at one or more other computing devices and/or a server device. A user can interact with the automated assistant 304 via assistant interface(s) 320, which can be a microphone, a camera, a touch screen display, a user interface, and/or any other apparatus capable of providing an interface between a user and an application. For instance, a user can initialize the automated assistant 304 by providing a verbal, textual, and/or a graphical input to an assistant interface 320 to cause the automated assistant 304 to initialize one or more actions (e.g., provide data, control a peripheral device, access an agent, generate an input and/or an output, etc.). Alternatively, the automated assistant 304 can be initialized based on processing of contextual data 336 using one or more trained machine learning models.

The contextual data 336 can characterize one or more features of an environment in which the automated assistant 304 is accessible, and/or one or more features of a user that is predicted to be intending to interact with the automated assistant 304. The computing device 302 can include a display device, which can be a display panel that includes a touch interface for receiving touch inputs and/or gestures for allowing a user to control applications 334 of the computing device 302 via the touch interface. In some implementations, the computing device 302 can lack a display device, thereby providing an audible user interface output, without providing a graphical user interface output. Furthermore, the computing device 302 can provide a user interface, such as a microphone, for receiving spoken natural language inputs from a user. In some implementations, the computing device 302 can include a touch interface and can be void of a camera, but can optionally include one or more other sensors.

The computing device 302 and/or other third party client devices can be in communication with a server device over a network, such as the internet. Additionally, the computing device 302 and any other computing devices can be in communication with each other over a local area network (LAN), such as a Wi-Fi network. The computing device 302 can offload computational tasks to the server device in order to conserve computational resources at the computing device 302. For instance, the server device can host the automated assistant 304, and/or computing device 302 can transmit inputs received at one or more assistant interfaces 320 to the server device. However, in some implementations, the automated assistant 304 can be hosted at the computing device 302, and various processes that can be associated with automated assistant operations can be performed at the computing device 302.

In various implementations, all or less than all aspects of the automated assistant 304 can be implemented on the computing device 302. In some of those implementations, aspects of the automated assistant 304 are implemented via the computing device 302 and can interface with a server device, which can implement other aspects of the automated assistant 304. The server device can optionally serve a plurality of users and their associated assistant applications via multiple threads. In implementations where all or less than all aspects of the automated assistant 304 are implemented via computing device 302, the automated assistant 304 can be an application that is separate from an operating system of the computing device 302 (e.g., installed "on top" of the operating system)—or can alternatively be implemented directly by the operating system of the computing device 302 (e.g., considered an application of, but integral with, the operating system).

In some implementations, the automated assistant 304 can include an input processing engine 306, which can employ multiple different modules for processing inputs and/or outputs for the computing device 302 and/or a server device. For instance, the input processing engine 306 can include a speech processing engine 308, which can process audio data received at an assistant interface 320 to identify the text embodied in the audio data. The audio data can be transmitted from, for example, the computing device 302 to the server device in order to preserve computational resources at the computing device 302. Additionally, or alternatively, the audio data can be exclusively processed at the computing device 302.

The process for converting the audio data to text can include a speech recognition algorithm, which can employ neural networks, and/or statistical models for identifying groups of audio data corresponding to words or phrases. The text converted from the audio data can be parsed by a data parsing engine 310 and made available to the automated assistant 304 as textual data that can be used to generate and/or identify command phrase(s), intent(s), action(s), slot value(s), and/or any other content specified by the user. In some implementations, output data provided by the data parsing engine 310 can be provided to a parameter engine 312 to determine whether the user provided an input that corresponds to a particular intent, action, and/or routine capable of being performed by the automated assistant 304 and/or an application or agent that is capable of being accessed via the automated assistant 304. For example, assistant data 338 can be stored at the server device and/or the computing device 302, and can include data that defines one or more actions capable of being performed by the automated assistant 304, as well as parameters necessary to perform the actions. The parameter engine 312 can generate one or more parameters for an intent, action, and/or slot value, and provide the one or more parameters to an output generating engine 314. The output generating engine 314 can use the one or more parameters to communicate with an assistant interface 320 for providing an output to a user, and/or communicate with one or more applications 334 for providing an output to one or more applications 334.

In some implementations, the automated assistant 304 can be an application that can be installed "on-top of" an operating system of the computing device 302 and/or can itself form part of (or the entirety of) the operating system of the computing device 302. The automated assistant application includes, and/or has access to, on-device speech recognition, on-device natural language understanding, and on-device fulfillment. For example, on-device speech recognition can be performed using an on-device speech recognition module that processes audio data (detected by the microphone(s)) using an end-to-end speech recognition machine learning model stored locally at the computing device 302. The on-device speech recognition generates recognized text for a spoken utterance (if any) present in the audio data. Also, for example, on-device natural language understanding (NLU) can be performed using an on-device NLU module that processes recognized text, generated using the on-device speech recognition, and optionally contextual data, to generate NLU data.

NLU data can include intent(s) that correspond to the spoken utterance and optionally parameter(s) (e.g., slot values) for the intent(s). On-device fulfillment can be performed using an on-device fulfillment module that utilizes the NLU data (from the on-device NLU), and optionally other local data, to determine action(s) to take to resolve the intent(s) of the spoken utterance (and optionally the parameter(s) for the intent). This can include determining local and/or remote responses (e.g., answers) to the spoken utterance, interaction(s) with locally installed application(s) to perform based on the spoken utterance, command(s) to transmit to internet-of-things (IoT) device(s) (directly or via corresponding remote system(s)) based on the spoken utterance, and/or other resolution action(s) to perform based on the spoken utterance. The on-device fulfillment can then initiate local and/or remote performance/execution of the determined action(s) to resolve the spoken utterance.

In various implementations, remote speech processing, remote NLU, and/or remote fulfillment can at least selectively be utilized. For example, recognized text can at least selectively be transmitted to remote automated assistant component(s) for remote NLU and/or remote fulfillment. For instance, the recognized text can optionally be transmitted for remote performance in parallel with on-device performance, or responsive to failure of on-device NLU and/or on-device fulfillment. However, on-device speech processing, on-device NLU, on-device fulfillment, and/or on-device execution can be prioritized at least due to the latency reductions they provide when resolving a spoken utterance (due to no client-server roundtrip(s) being needed to resolve the spoken utterance). Further, on-device functionality can be the only functionality that is available in situations with no or limited network connectivity.

In some implementations, the computing device 302 can include one or more applications 334 which can be provided by a third-party entity that is different from an entity that provided the computing device 302 and/or the automated assistant 304. An application state engine of the automated assistant 304 and/or the computing device 302 can access application data 330 to determine one or more actions capable of being performed by one or more applications 334, as well as a state of each application of the one or more applications 334 and/or a state of a respective device that is associated with the computing device 302. A device state engine of the automated assistant 304 and/or the computing device 302 can access device data 332 to determine one or more actions capable of being performed by the computing device 302 and/or one or more devices that are associated with the computing device 302. Furthermore, the application data 330 and/or any other data (e.g., device data 332) can be accessed by the automated assistant 304 to generate contextual data 336, which can characterize a context in which a particular application 334 and/or device is executing, and/or a context in which a particular user is accessing the computing device 302, accessing an application 334, and/or any other device or module.

While one or more applications 334 are executing at the computing device 302, the device data 332 can characterize a current operating state of each application 334 executing at the computing device 302. Furthermore, the application data 330 can characterize one or more features of an executing application 334, such as content of one or more graphical user interfaces being rendered at the direction of one or more applications 334. Alternatively, or additionally, the application data 330 can characterize an action schema, which can be updated by a respective application and/or by the automated assistant 304, based on a current operating status of the respective application. Alternatively, or additionally, one or more action schemas for one or more applications 334 can remain static, but can be accessed by the application state engine in order to determine a suitable action to initialize via the automated assistant 304.

The computing device 302 can further include an assistant invocation engine 322 that can use one or more trained machine learning models to process application data 330, device data 332, contextual data 336, and/or any other data that is accessible to the computing device 302. The assistant invocation engine 322 can process this data in order to determine whether or not to wait for a user to explicitly speak an invocation phrase to invoke the automated assistant 304, or consider the data to be indicative of an intent by the user to invoke the automated assistant—in lieu of requiring the user to explicitly speak the invocation phrase. For example, the one or more trained machine learning models can be trained using instances of training data that are based on scenarios in which the user is in an environment where multiple devices and/or applications are exhibiting various operating states. The instances of training data can be generated in order to capture training data that characterizes contexts in which the user invokes the automated assistant and other contexts in which the user does not invoke the automated assistant. When the one or more trained machine learning models are trained according to these instances of training data, the assistant invocation engine 322 can cause the automated assistant 304 to detect, or limit detecting, spoken invocation phrases from a user based on features of a context and/or an environment.

In some implementations, the assistant invocation engine 322 can process data generated using one or more assistant interfaces 320 to determine whether a user is expressing a willingness to benefit from an operation of the automated assistant 304 and/or the robotic computing device. For example, data captured via one or more assistant interfaces 320 can be processed by the assistant invocation engine 322 to determine whether a spoken utterance, non-verbal gesture, disfluency, and/or other motion of the user can be considered an invocation for the robotic computing device. Alternatively, or additionally, the data can be processed to determine a context in which the user provided such inputs and/or motion. Based on the determined context and/or expression of the user, the robotic computing device can determine whether the user is willing to allow the robotic computing device to perform a particular operation. The operation can be, for example, providing the user with information and/or directing the user to a particular location, despite the user not providing an express solicitation for the robotic computing device to do so.

In some implementations, the system 300 can include a drive parameter engine 316, which can determine one or more parameters for maneuvering the robotic computing device in certain contexts and/or based on certain data. For example, data that provides a basis for a particular operation to be performed by the robotic computing device can be processed by the drive parameter engine 316 to determine how to maneuver the robotic computing device when fulfilling the particular operation. For example, application data 330, device data 332, and/or contextual data 336 can be processed to determine whether there is any urgency and/or temporal limitations associated with a particular request from a user. In some implementations, this can be determined using one or more heuristic processes and/or one or more trained machine learning models. Alternatively, or additionally, data associated with the request can be processed by the drive parameter engine 316 to generate an embedding that can be mapped to a latent space, wherein a distance in latent space to a certain point and/or area can indicate whether a request is urgent or not. This processing by the drive parameter engine 316 can be utilized to determine drive parameters such as velocity, acceleration, travel time, power limit, and/or any other parameter that can be associated with driving a robotic device.

For example, application data 330 can indicate that the user has requested to be directed to a location of a device that has provided an urgent notification. The application data 330 can be processed by the drive parameter engine 316 to determine that an application is exhibiting a particular status, and that the particular status is predicted to be particularly urgent—relative to other notifications and/or other application statuses. In some implementations, this determination can be based on whether the application status has a temporal quality (e.g., a phone is ringing and an important contact is calling, so there is only a certain amount of time to answer the phone call). Based on this determination, the drive parameter engine 316 can identify a velocity parameter for controlling one or more motors of the robotic computing device when fulfilling the request to be directed to the location of the device. In some implementations, the system 300 can include a layout detection engine 318 that can allow the robotic computing device to determine a relative location of rooms and/or other features within a space or structure that the robotic computing device is located. For example, the device detection engine 318 can be utilized by the robotic computing device when attempting to identify a location of a device, user, room, and/or feature of a space and/or structure in response to an input from a user.

In some implementations, the layout detection engine 318 can cause other devices to provide an output for assisting with determining a present location of the robotic computing device relative to other portions of a space in which the robotic computing device is located. For instance, the layout detection engine 318 can process application data 330 to determine that a device in a particular room has a user-defined label (e.g., "Laundry room speaker"), which can indicate a title for the particular room (e.g., "Laundry room"). When the robotic computing device is directed to enter the particular room, the layout detection engine 318 can cause the device(s) to provide an output (e.g., illuminate a light or display, render audio, transmit an antenna signal, etc.) The layout detection engine 318 can identify one or more different characteristics (e.g., a signal metric) of the output(s) (e.g., signal quality, amplitude, magnitude, audio frequency, light frequency, etc.) from one or more different devices, received within a temporal window or duration of time, to determine a relative location of the particular room compared to a present location of the robotic computing device.

For example, the robotic computing device can determine whether the robotic computing device is co-located with one or more devices having semantic labels that are associated with a room specified by, or inferred from, a user request. Based on this determination, the layout detection engine 318 can determine how to maneuver the robotic computing device from the present location of the robotic computing device to the location of the desired room. In some implementations, locations within a structure (e.g., a home or a business) can be mapped using a public knowledge graph and/or a personal knowledge graph analysis. A public knowledge graph can be generated based on prior interactions between one or more users, persons, and one or more other applications. Alternatively, or additionally, a private knowledge graph can be generated based on prior interactions between the user and one or more applications (e.g., an assistant application and/or IoT application).

In some implementations, the system 300 can include a position preference engine 326 that can determine a preferred location of the robotic computing device for performing certain operations, interacting with a particular user, and/or otherwise positioning the robotic computing device. The position preference engine 326 can process data using one or more heuristic processes and/or trained machine learning models to determine whether a current position of the robotic computing device is suitable for fulfilling a request from a user. In some implementations, a preferred position can be directly requested by a user and/or inferred from one or more prior interactions with one or more users. For instance, a user can expressly or indirectly request that the robotic computing device perform certain operations (e.g., facilitating a phone call or video call) at a first location within a room, and perform other operations (e.g., playing music) at a second location within the room. These preferred locations can be different for different users and/or for different rooms.

For example, when a first user receives a voice call via the robotic computing device, the robotic computing device may navigate to a first location in a room. However, when a second user receives a voice call, the robotic computing device may navigate to a second location in the room so that the second user can receive the voice call via the robotic computing device. In some implementations, the position preference engine 326 can determine dynamic positions for the robotic computing device. For example, a first user can prefer that the robotic computing device trail the first user by a distance x (where y is any distance value) when playing music. However, a second user can prefer that the robotic computing device trail the second user by a different distance y (where y is any distance value) when rendering a news report and conference call.

Figure 4:
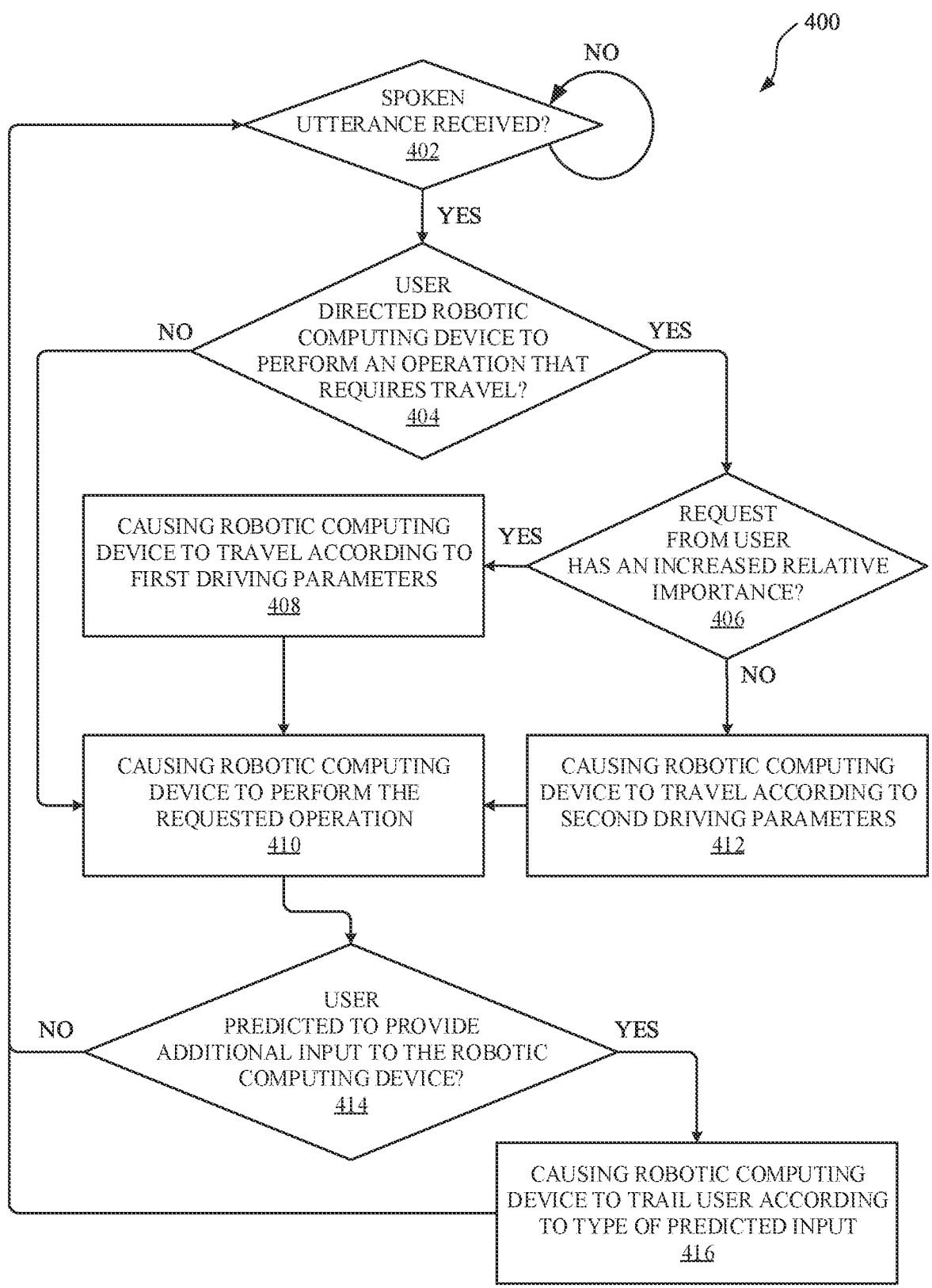
FIG. 4 illustrates a method for operating a robotic computing device to paraphrase user inputs and/or user responses that may be relayed, by the robotic computing device, from a first user to a second user.

FIG. 4 illustrates a method 400 for operating a robotic computing device to paraphrase user inputs and/or user responses that may be relayed, by the robotic computing device, from a first user to a second user. The robotic computing device can relay messages between locations at different velocities according to a type of input expressly provided to the robotic computing device and/or inferred by the robotic computing device. The method 400 can be performed by one or more computing devices, applications, and/or any other apparatus or module that can be associated with an automated assistant. The method 400 can include an operation 402 of determining whether a spoken utterance and/or other user input has been provided to a robotic computing device. The robotic computing device can be a computing device that can maneuver to various locations within a home of a user, and connect to one or more different networks for sending and receiving data. When a spoken utterance or other user input is detected at the robotic computing device, the method 400 can proceed to the operation 404. Otherwise, the robotic computing device can continue to determine whether the user has provided an input.

The operation 404 can include determining whether the user directed the robotic computing device to perform an operation that may require travel. An operation that may require travel can include relaying a message to another user that may not be located within a distance in which the robotic computing device can project audible sound and/or visible audio. For example, the spoken utterance from a first user can include a request for the robotic computing device to provide an audible message to a second user that is located in a different room than the first user. The spoken utterance from the first user can be, for example, "Tell Phoenix that I need to leave because Sherri just pulled up to the house." This spoken utterance can embody a request for the robotic computing device to perform at least an operation of maneuvering to a location of a second user (e.g., "Phoenix"), and another operation of providing the second user with a message (e.g., "Sherri has just pulled up to the house, so Mark is going to leave now."). When a request for the robotic computing device to travel to another location is determined to have been received, the method 400 can proceed from the operation 404 to an operation 406. Otherwise, the method 400 can proceed from the operation 404 to an operation 410.

The operation 406 can include determining whether the request from the user has an increased relative importance. An increased relative importance can refer to a priority or severity of the request relative to other requests submitted by the user and/or one or more other users. For example, in some implementations, vocal characteristics of a spoken utterance (e.g., cadence, words per second, etc.) can be identified and processed to determine whether the spoken utterance is intended to have an increased relative importance. In some implementations, operation requests corresponding to temporal events can indicate a relative importance of the request. For example, a request associated with circumstances that have at least a particular probability of not changing within a threshold duration of time can be considered of non-increased relative importance. However, a different request associated with circumstances that have at least a particular probability of changing within the threshold duration of time can be considered of increased relative importance.

When the spoken utterance, "Tell Phoenix that I need to leave because Sherri just pulled up to the house," is received by the robotic computing device, the spoken utterance can be determined to embody a request of increased relative importance. This determination can be at least partially based on one or more heuristic processes and/or one or more trained machine learning models. For example, the robotic computing device and/or other computing device can determine that the request embodied in the spoken utterance characterizes a temporal event (e.g., the user needing to leave) and/or is provided in a tone that indicates urgency (e.g., a cadence of the voice of the user such as, " . . . I . . . need . . . to . . . leave . . . "). Based on historical interactions between the user and the robotic computing device, and/or one or more other applications, the robotic computing device can determine that this cadence is different from a typical cadence of the user and is indicative of a sense of urgency.

When the user is determined to have provided a request that has an increased relative importance, the method 400 can proceed to an operation 408. Otherwise, the method 400 can proceed to an operation 412. The operation 408 can include causing the robotic computing device to travel according to first driving parameters. For example, the first driving parameters can include, but are not limited to, an amount of acceleration, an amount of velocity, and/or an amount of energy, utilized for fulfilling the request from the user. When the first driving parameters are selected, the amount of energy consumed and/or a velocity of the robotic computing device can be selected to be increased relative to other values that are selected for requests of non-increased relative importance. For instance, the operation 412 can include causing the robotic computing device to travel according to second driving parameters, which can be different than the first driving parameters. The second driving parameters can characterize a velocity setting and/or acceleration setting that can be lower than those settings corresponding to the first driving parameters. When the first driving parameters and/or the second driving parameters are employed for controlling a travel operation of the robotic computing device, the method 400 can proceed from the operation 408, or the operation 412, to an operation 410.

The operation 410 can include causing the robotic computing device to perform the requested operation. The operation 410 can be performed when the user arrives at the destination and/or on the way to the corresponding destination. The requested operation can be, for example, rendering an output to another user, identifying a location of another computing device, retrieving information that is available at the destination, and/or any other operation that a computing device can be requested to perform. In furtherance of the aforementioned example, the robotic computing device can render an audible output such as, "Sherri has just pulled up to the house, so Mark is going to leave now," to the second user (i.e., Phoenix). In some implementations, the output from the robotic computing device can be different than the spoken utterance from the first user, but can convey information provided by the first user. The method 400 can proceed from the operation 410 to an operation 414 of determining whether the first user, the second user, or another user, is predicted to provide an additional request to the robotic computing device.

The robotic computing device can determine whether a user is predicted to provide the additional request to the robotic computing device based on one or more direct and/or indirect gestures performed by the user. For example, the robotic computing device can, with prior permission from the user, determine that the user has gazed at the device, directed their voice to the device, moved toward the device, and/or performed a gesture that indicates an interest in the user providing an additional request to the robotic computing device. In furtherance of the aforementioned example, the operation 414 can be performed with respect to the first user and/or the second user. For example, when the robotic computing device reaches the second user and provides the audible output, the robotic computing device can determine, with prior permission from the second user, whether the second user is predicted to provide the robotic computing device with an input. Alternatively, or additionally, the operation 414 can be performed when the robotic computing device returns to the first user, after having provided the audible output to the second user. When the user is predicted to provide an additional input to the robotic computing device, the method 400 can proceed to an operation 416. Otherwise, the method 400 can return to the operation 402 for determining whether an input has been provided to the robotic computing device.

The operation 416 can include causing the robotic computing device to trail, or otherwise maneuver with, the user according to the type of predicted input. For example, when the robotic computing device has predicted that the second user will provide an input in response to the audible output, the robotic computing device can maneuver with the second user. In some implementations, the robotic computing device can maneuver with the second user for a duration of time that corresponds to the type of predicted input and/or a confidence score for the input prediction. For example, when the robotic computing device predicts a forthcoming input with a first confidence score, the robotic computing device can trail the user for a first duration of time. However, when the robotic computing device predicts another forthcoming input with a second confidence score that is greater than the first confidence score, the robotic computing device can trail the user for a second duration of time that is longer than the first duration of time. Thereafter, the method 400 can return to the operation 402 for determining whether a user provided an input to the robotic computing device.

Figure 5:
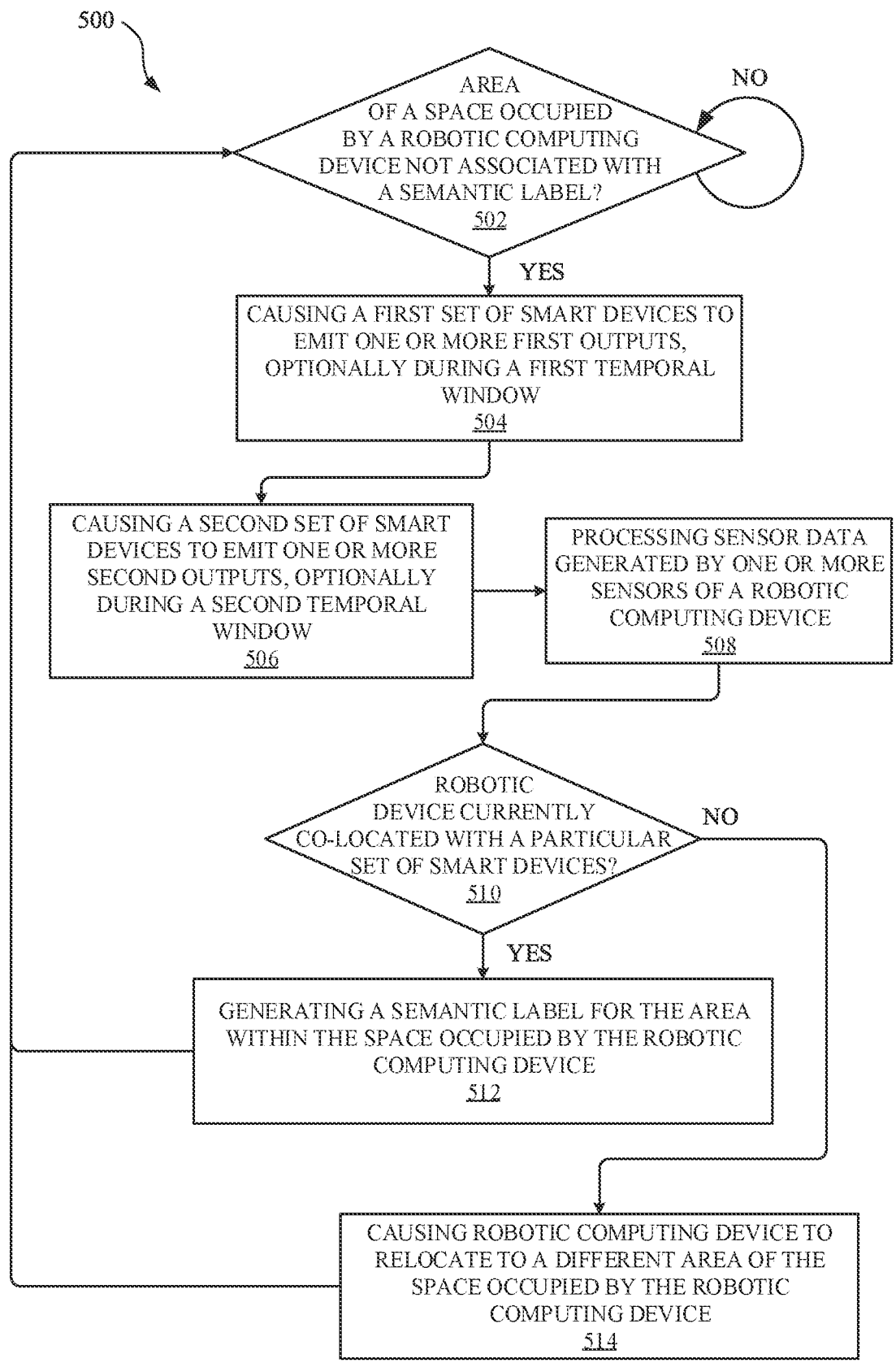
FIG. 5 illustrates a method for operating a robotic computing device to autonomously assign semantic labels to areas of a space or structure in furtherance of ensuring certain actions are performed in certain areas according to user preferences.

FIG. 5 illustrates a method 500 for operating a robotic computing device to autonomously assign semantic labels to one or more areas within a space or structure occupied by one or more users and/or the robotic computing device. The semantic labels can be assigned to certain locations in furtherance of ensuring that the robotic computing device performs certain actions in certain areas according to user preferences. The method 500 can be performed by any computing device, application, and/or any apparatus or module capable of interacting with a robotic computing device. The method 500 can include an operation 502 of determining whether an area of a space occupied by a robotic computing device is not associated with a semantic label. For example, the robotic computing device can operate in a home occupied by one or more users (e.g., a mother user and a daughter user), and the home can include a variety of different areas (e.g., different portions of a living room, kitchen, office, bedroom, etc.). The operation 502 can be initialized when the robotic computing device is located in a kitchen of the home, prior to, or in response to, a user providing an input to the robotic computing device. In this way, each semantic label can assist the robotic computing device with executing particular actions, which may be performed more effectively with information related to locations at and/or near the robotic computing device. For instance, when the robotic computing device is directed by a first user to communicate with a second user within the home, the robotic computing device can access semantic labels for different portions of the home to predict, with prior permission from the second user, a location of the second user and optionally, thereafter, a location of the first user.

When the robotic computing device determines that a space occupied by, or near, the robotic computing device is not associated with a semantic label, the method 500 can proceed from the operation 502 to an operation 504. Otherwise, the robotic computing device can continue to determine whether a space at or near the robotic computing device is associated with a semantic label. The operation 504 can include causing a first set of smart devices to emit one or more first outputs during a first temporal window. The first set of smart devices can be selected for emitting the one or more first outputs based on the first set of smart devices having assigned labels with related content (e.g., "Kitchen counter speaker," "Refrigerator smart display," etc.). Alternatively, or additionally, the first set of smart devices can include certain devices that are located at one or more particular locations on a map generated over time using data from one or more sensors of the robotic computing device. For example, as the robotic computing device maneuvers to different locations within the home of the first user, the robotic computing device can capture (with prior permission from user(s) within the home) data that characterizes certain locations of certain devices within the home. This data can be utilized to correlate these devices with locations on a mapping that is generated by the robotic computing device and/or one or more other devices.

The method 500 can proceed from the operation 504 to an operation 506 that can include causing a second set of smart devices to emit one or more second outputs during a second temporal window. In some implementations, the one or more first outputs and the one or more second outputs can include audio outputs and/or visual outputs. For example, the one or more first outputs can include one or more characteristics that are the same or different from one or more other characteristics of the one or more second outputs. For instance, the one or more first outputs can embody one or more frequencies (e.g., audio and/or visual) that are different than one or more other frequencies (e.g., audio and/or visual) embodied by the one or more second outputs. In some implementations, the second set of smart devices can be selected for emitting the one or more second outputs based on the robotic computing device determining the second set of smart devices are located in a different room and/or different area of the space than the first set of smart devices.

The method 500 can proceed from the operation 506 to an operation 508, which can include processing sensor data generated by one or more sensors of the robotic computing device. In some implementations, the first temporal window and the second temporal window can be durations of time that are at least partially overlapping, or are non-overlapping. For example, sensor data captured during the first temporal window can have the same, or different, time stamps than other sensor data captured during the second temporal window. In some implementations, sensor data captured by the robotic computing device and/or one or more other computing devices can be processed to determine whether the first set of smart devices and/or the second set of smart devices are co-located with the robotic computing device. For example, a magnitude of a detected output during the first temporal window can be compared to a magnitude of another detected output during the second temporal window. This comparison can indicate whether the first set of smart devices or the second set of smart devices are co-located at or near an area occupied by the robotic computing device. Alternatively, or additionally, one or more characteristics of a detected output can be determined and compared to a first set of characteristics and/or a second set of characteristics. When the first set of characteristics are detected as being embodied in an output detected by the robotic computing device, the robotic computing device can determine that the first set of smart devices are co-located at or near the robotic computing device. Alternatively, or additionally, when the second set of characteristics are detected as being embodied in an output detected by the robotic computing device, and optionally the second set of characteristics are not, the robotic computing device can determine that the second set of smart devices are co-located at or near the robotic computing device.

In some implementations, detected characteristics can include a magnitude of an output, frequency of an output, change in magnitude of an output (e.g., compared to a set magnitude), change or modulation of a frequency of an output (e.g., compared to a set frequency), and/or any other characteristic(s) that can be associated with a rendered output. In some implementations, audio and/or visual outputs can be rendered at one or more frequencies that may not be visually detectable and/or audibly detectable by a natural human and/or a human that is unassisted by non-inherent features. In some implementations, outputs rendered by a set of devices can include a combination of one or more different outputs (e.g., outputs rendered by different interface modalities) that can be distinguished from other outputs rendered by another set of devices.

When the robotic computing device is determined to be co-located with a particular set of smart devices (e.g., the first set and/or the second set), the method 500 can proceed from the operation 510 to an operation 512. The operation 512 can include generating a semantic label for an area within the space currently occupied by the robotic computing device. In some implementations, the set of smart devices can include, but are not limited to, a smart light, a smart television, a smart thermostat, a smart speaker, and/or any other device that can be associated with a user and can be controlled via a separate device and/or application. In some implementations, the semantic label can be based on an existing descriptor of a room within the space or structure, and that was previously assigned to the detected set of smart devices. For instance, the detected set of smart devices can be assigned a descriptor (e.g., "Sam's room [device type]") by a user in response to an express user input to an automated assistant and/or other device or application. Alternatively, or additionally, the detected set of smart devices can be assigned a descriptor that can be generated based on processing data using one or more heuristic processes and/or one or more machine learning models. When the area occupied by the robotic computing device is assigned the semantic label, the semantic label can be stored in association with a location on a generated map that can be utilized by the robotic computing device for maneuvering between locations within the space or structure.

When a user provides, for example, a spoken input that is synonymous with the semantic label, the robotic computing device can correlate the spoken input with the area to which the semantic label is assigned. In this way, robotic computing device can utilize existing data and/or other information for mapping a home of a user without the user having to expressly identify, to the robotic computing device, areas within the home. This can allow the robotic computing device to fulfill certain requests with less information being expressly provided by a user, thereby preserving computational resources of the robotic computing device. For example, when a semantic label (e.g., "Sherri's room") is assigned to an area of a map, the robotic computing device can navigate to that area in certain instances when the semantic label (or synonymous term and/or portion of the semantic label) is identified in a natural language input (e.g., "Go tell Sherri that dinner is ready") provided to the robotic computing device. When the robotic computing device determines that neither set of smart devices are co-located with the robotic computing device, the method 500 can proceed from the operation 510 to an operation 514. The operation 514 can include causing the robotic computing device to relocate to a different area of the space (e.g., a home) that is occupied by the user and/or the robotic computing device and optionally perform the operation 502.

Figure 6:
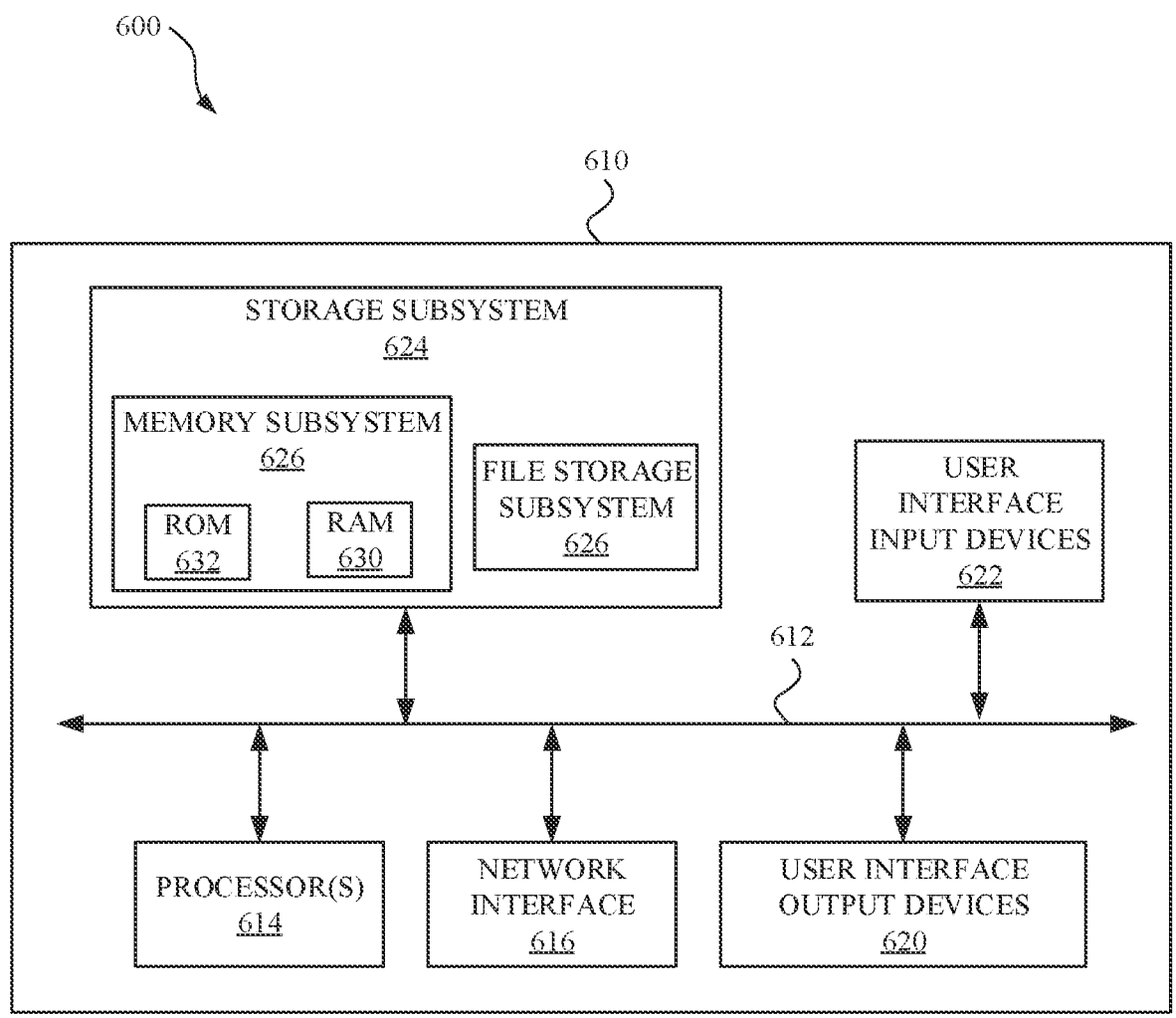
FIG. 6 is a block diagram of an example computer system.

FIG. 6 is a block diagram 600 of an example computer system 610. Computer system 610 typically includes at least one processor 614 which communicates with a number of peripheral devices via bus subsystem 612. These peripheral devices may include a storage subsystem 624, including, for example, a memory 626 and a file storage subsystem 626, user interface output devices 620, user interface input devices 622, and a network interface subsystem 616. The input and output devices allow user interaction with computer system 610. Network interface subsystem 616 provides an interface to outside networks and is coupled to corresponding interface devices in other computer systems.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 610 to the user or to another machine or computer system.

Storage subsystem 624 stores programming and data constructs that provide the functionality of some or all of the modules described herein. For example, the storage subsystem 624 may include the logic to perform selected aspects of method 400, method 500, and/or to implement one or more of system 300, robotic computing device 104, robotic computing device 204, automated assistant, and/or any other application, device, apparatus, and/or module discussed herein.

These software modules are generally executed by processor 614 alone or in combination with other processors. Memory 626 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computer system 610 communicate with each other as intended. Although bus subsystem 612 is shown schematically as a single bus, alternative implementations of the bus subsystem may use multiple busses.

Computer system 610 can be of varying types including a workstation, server, computing cluster, blade server, server farm, or any other data processing system or computing device. Due to the ever-changing nature of computers and networks, the description of computer system 610 depicted in FIG. 6 is intended only as a specific example for purposes of illustrating some implementations. Many other configurations of computer system 610 are possible having more or fewer components than the computer system depicted in FIG. 6.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In some implementations, a method implemented by one or more processors is provided and includes determining, by a robotic computing device, that a user has uttered a spoken utterance that indicates that the user is unsure of a location of a particular computing device. The spoken utterance does not embody an express request for the robotic computing device to identify the location of the particular computing device. The method can further include causing, by the robotic computing device, an output interface of the robotic computing device to provide, to the user, an indication that the robotic computing device is capable of determining the location of the particular computing device. The method can further include processing, by the robotic computing device, input data from one or more input interfaces of the robotic computing device in furtherance of determining whether the user is willing to allow the robotic computing device to direct the user towards the location of the particular computing device. The method can further include, when the robotic computing device has determined that the user is willing to allow the robotic computing device to direct the user towards the location of the particular computing device: causing the robotic computing device to communicate with the particular computing device in furtherance of estimating a relative location of the particular computing device to the robotic computing device, and causing the robotic computing device to maneuver towards the relative location of the particular computing device.

These and other implementations of the technology disclosed herein can optionally include one or more of the following features.

In some implementations, processing the input data in furtherance of determining whether the user is willing to allow the robotic computing device to direct the user towards the location of the particular computing device includes: processing image data that indicates a motion of the user toward the robotic computing device. In some implementations, the input data is void of audio data that characterizes an express solicitation, from the user, for the robotic computing device to determine the relative location of the particular computing device. In some implementations, causing the robotic computing device to maneuver towards the relative location of the particular computing device includes: causing the robotic computing device to maneuver toward the relative location of the particular computing device at a velocity that is selected based on a status of an application that is accessible via the particular computing device. In some of those implementations, the application includes a voice calling application and the status of the application indicates that the user has missed a call from a particular contact. In some implementations, causing the robotic computing device to communicate with the particular computing device in furtherance of estimating the relative location of the particular computing device to the robotic computing device includes: determining a signal metric that is based on a communication between the robotic computing device and the particular computing device, where the signal metric indicates a relative distance of the particular computing device from the robotic computing device. In some of those implementations, the signal metric includes an audio amplitude of an audio output being rendered by the particular computing device.

In some implementations, a method implemented by one or more processors is provided and includes receiving, by a robotic computing device, a spoken utterance from a first user who is located in a space with the robotic computing device and a second user. The method can further include determining, based on the spoken utterance, that the first user has directed the robotic computing device to communicate with the second user. The second user is located at a second user location that is different than a first user location of the first user. The method can further include causing, in response to the spoken utterance, the robotic computing device to maneuver to the second user location and render an output for the second user. The output embodies a natural language inquiry that is based on the spoken utterance from the first user. The method can further include receiving, by the robotic computing device, a responsive input from the second user. The responsive input embodies natural language content that is responsive to the natural language inquiry embodied in the output from the robotic computing device. The method can further include causing, subsequent to the robotic computing device providing the output for the second user, the robotic computing device to maneuver to the first user location and render another output for the first user. The other output characterizes the responsive input from the second user and embodies other natural language content that is different than the natural language content embodied in the responsive input from the second user.

These and other implementations of the technology disclosed herein can optionally include one or more of the following features.

In some implementations, causing the robotic computing device to maneuver to the second user location includes: determining a location preference associated with the second user. In some versions of those implementations, and causing the robotic computing device to maneuver to the second user location includes causing the robotic computing device to maneuver to a particular location that corresponds to the preferred location indicated by the location preference. The location preference can indicate a preferred location for the robotic computing device when the robotic computing device communicates with the second user. In some of those versions, the preferred location indicates a preferred distance of the robotic computing device from the second user, and the particular location is at least the preferred distance away from the second location of the second user. In some implementations, causing the robotic computing device to maneuver to the first user location includes: determining a location preference associated with the first user, and causing the robotic computing device to maneuver to a particular location that corresponds to the preferred location indicated by the location preference. The location preference can indicate a preferred location for the robotic computing device when the robotic computing device renders a particular type of output for the first user. For example, the particular type of output includes an audible output that is provided via an audio output interface of the robotic computing device, or a visual output that is provided via a display interface of the robotic computing device. For instance, the particular type of output can be audible output with content that characterizes a message from another user.

In some implementations, a method implemented by one or more processors is provided and includes determining, at a robotic computing device, that a user has requested that the robotic computing device performs an operation in a particular room that is located in a space that includes multiple different rooms. The method can further include causing, by the robotic computing device, one or more devices in one or more rooms of the multiple different rooms to provide one or more respective outputs that are detectable by the robotic computing device. The method can further include determining, based on the one or more respective outputs, whether a current location of the robotic computing device corresponds to the particular room. The method can further include, when the current location of the robotic computing device does not correspond to the particular room: causing, based on the current location of the robotic computing device not corresponding to the particular room, the robotic computing device to relocate to the particular room, and causing the robotic computing device to perform the operation when the robotic computing device is located in the particular room.

These and other implementations of the technology disclosed herein can optionally include one or more of the following features.

In some implementations, causing the robotic computing device to relocate to the particular room includes: determining that a particular portion of the particular room is preferred, by the user, for performing a particular type of operation corresponding to the operation, and causing the robotic computing device to relocate to the particular portion of the particular room. In some implementations, causing the robotic computing device to relocate to the particular room includes: determining that a particular portion of the particular room is preferred, by the user, for performing a particular type of operation that does not correspond to the operation, and causing the robotic computing device to relocate to a different portion of the particular room. In some implementations, the method can further include, when the current location of the robotic computing device does correspond to the particular room: causing the robotic computing device to identify, within a current room that the robotic computing device is located in, a portion of the current room that is a preferred portion for performing the operation. In some of those implementations, causing the robotic computing device to identify the portion of the current room that is the preferred portion of the room for performing the operation includes: determining, based on the user requesting the operation, that the user previously requested the robotic computing device to perform a particular type of operation, corresponding to the operation, at the preferred portion of the room. In some implementations, the method can further include, when the current location of the robotic computing device does not correspond to the particular room: causing, prior to the robotic computing device performing the operation, the robotic computing device to render an output that solicits the user to confirm that a present location of the robotic computing device is approved for performing the operation. In some implementations, the method can further include, when the current location of the robotic computing device does correspond to the particular room: causing the robotic computing device to identify, within a current room that the robotic computing device is located in, a relative distance to follow the user when performing the operation while the user is relocating to another portion of the particular room.

In some implementations, a method implemented by one or more processors is provided and includes determining, by a mobile robotic computing device and based on a map generated based at least in part on sensor observations of the mobile robotic computing device, that the mobile robotic computing device is currently located within a particular area of a structure (e.g., within a room of a home). The method can further include, while the mobile robotic computing device is located within the particular area: causing a first subset of smart devices to each emit one or more first outputs and causing a second subset of the smart devices to each emit one or more second outputs. The one or more first outputs are audible and/or visual, and wherein the one or more first outputs are caused to be emitted during a first temporal window and/or with one or more first characteristics responsive to the first subset of smart devices each being assigned a first semantic label in a home graph. The one or more second outputs are audible and/or visual, and wherein the one or more second outputs are caused to be emitted during a second temporal window and/or with one or more second characteristics responsive to the second subset of smart device each being assigned a second semantic label in the home graph. The method can further include obtaining sensor data during the emission of the one or more first outputs and the one or more second outputs. The sensor data is generated by one or more sensors of the mobile robotic computing device. The method can further include determining, based on analysis of the sensor data, that the first subset of smart devices are co-located with the robot in the particular area. Determining that the first subset of smart devices are co-located with the robot in the particular area is based on: (1) the analysis indicating detected output that is during the first temporal window and/or that matches the one or more first characteristics, and/or (2) a magnitude of the detected output that is during the first temporal window and/or that matches the one or more first characteristics. The method can further include, in response to determining that the first subset of smart devices are co-located with the robot in the given room: assigning an inferred semantic label to the particular area. The inferred semantic label can be the same as, or derived from, the first semantic label assigned to the first subset of smart devices in the home graph.

These and other implementations of the technology disclosed herein can optionally include one or more of the following features.

In some implementations, the one or more first outputs are emitted during the first temporal window and the one or more second outputs are emitted during the second temporal window. In some versions of those implementations, determining that the first subset of smart devices are co-located with the robot in the particular area includes: determining that the detected output occurs during the first temporal window and determining that there is no detected output that occurs during the second temporal window. In some additional or alternative versions of those implementations, determining that the first subset of smart devices are co-located with the robot in the particular area includes: determining that the magnitude, of the detected output that occurs during the first temporal window, is greater than an additional magnitude of additional detected output that occurs during the second temporal window. In some implementations, the one or more first outputs have the first characteristics and wherein the one or more second outputs have the second characteristics. In some versions of those implementations, determining that the first subset of smart devices are co-located with the robot in the particular area includes: determining that the detected output matches the first characteristics and determining that there is no detected output that matches the second characteristics. In some of those versions, the one or more first characteristics include a first frequency and the one or more second characteristics comprise a second frequency. For example, the first output can include visual output and the first frequency can be a first visual frequency; and the second output can include second visual output and the second frequency can be a second visual frequency. In some implementations, the one or more first outputs have the first characteristics and the one or more second outputs have the second characteristics, and wherein determining that the first subset of smart devices are co-located with the robot in the particular area includes: determining that a magnitude of the first characteristics in the detected output is greater than an additional magnitude of the second characteristics in the detected output. In some versions of those implementations, the one or more first characteristics include a first frequency and the one or more second characteristics include a second frequency. For example, the first output can include audible output and the first frequency is a first audible frequency that is outside of the range of human hearing; and the second output can include audible output and the second frequency is a second audible frequency that is outside of the range of human hearing.

In some implementations, the first subset of smart devices include a standalone automated assistant device and the one or more first outputs include a first audible output via a hardware speaker of the automated assistant device. In some implementations, the first subset of smart devices include a standalone automated assistant device and the one or more first outputs include a first visual output via a hardware display of the automated assistant device or via a light emitting diode of the automated assistant device. In some implementations, the first subset of smart devices include a smart light, a smart television, and/or a smart thermostat. In some implementations, the first semantic label in the home graph is a first descriptor, of a first room within a structure, that was previously assigned to the first subset of smart devices based on first explicit user inputs; and/or the second semantic label in the home graph is a second descriptor, of a second room within a structure, that was previously assigned to the second subset of smart devices based on second explicit user inputs. In some implementations, assigning the inferred semantic label to the particular area includes: automatically assigning the inferred semantic label to the particular area in the map for use by the mobile robotic device. In some versions of those implementations, the method can further include, subsequent to automatically assigning the inferred semantic label to the particular area in the map for use by the mobile robotic device: using the inferred semantic label in controlling navigation of the mobile robotic device. In some of those versions, using the inferred semantic label in controlling navigation of the mobile robotic device include: determining, based on processing a spoken input detected at one or more microphones of the mobile robotic device, that one or more terms of the spoken input match the inferred semantic label; and based on determining that the one or more terms match the inferred semantic label, and based on the inferred semantic label being assigned to the particular area in the map, causing the robot to navigate to the particular area. In some implementations, assigning the inferred semantic label to the particular area includes: suggesting, to a user in a graphical user interface, that the inferred semantic label be assigned to the particular area in the map for use by the mobile robotic device; and in response to receiving affirmative user interface input of the user responsive to the suggesting, assigning the inferred semantic label to the particular area in the map for use by the mobile robotic device.

We claim:

1. A method implemented by one or more processors, the method comprising:
    determining, by a mobile robotic computing device and based on a map generated based at least in part on sensor observations of the mobile robotic computing device, that the mobile robotic computing device is currently located within a particular area of a structure;
    while the mobile robotic computing device is located within the particular area:
        causing a first subset of smart devices to each emit one or more first outputs, wherein the one or more first outputs are audible and/or visual, and wherein the one or more first outputs are caused to be emitted during a first temporal window responsive to the first subset of smart devices each being assigned a first semantic label in a home graph;
        causing a second subset of the smart devices to each emit one or more second outputs, wherein the one or more second outputs are audible and/or visual, and wherein the one or more second outputs are caused to be emitted during a second temporal window responsive to the second subset of smart device each being assigned a second semantic label in the home graph; and
        obtaining sensor data during the emission of the one or more first outputs and the one or more second outputs, wherein the sensor data is generated by one or more sensors of the mobile robotic computing device;
    determining, based on analysis of the sensor data, that the first subset of smart devices are co-located with the mobile robotic computing device in the particular area, wherein determining that the first subset of smart devices are co-located with the mobile robotic computing device in the particular area comprises:
        determining that a magnitude, of the detected output that occurs during the first temporal window, is greater than an additional magnitude of additional detected output that occurs during the second temporal window; and
    in response to determining that the first subset of smart devices are co-located with the mobile robotic computing device in the particular area:
        assigning an inferred semantic label to the particular area, the inferred semantic label being the same as, or derived from, the first semantic label assigned to the first subset of smart devices in the home graph.

2. The method of claim 1, wherein the one or more first outputs have first characteristics and wherein the one or more second outputs have second characteristics, and wherein determining that the first subset of smart devices are co-located with the mobile robotic computing device in the particular area further comprises:
    determining that the detected output matches the first characteristics and determining that there is no detected output that matches the second characteristics.

3. The method of claim 2, wherein the one or more first characteristics comprise a first frequency and wherein the one or more second characteristics comprise a second frequency.

4. The method of claim 3,
    wherein the first output comprises visual output and the first frequency is a first visual frequency;
    wherein the second output comprises visual output and the second frequency is a second visual frequency.

5. The method of claim 3,
    wherein the first output comprises audible output and the first frequency is a first audible frequency that is outside of the range of human hearing; and
    wherein the second output comprises audible output and the second frequency is a second audible frequency that is outside of the range of human hearing.

6. The method of claim 1, wherein the first subset of smart devices comprise a standalone automated assistant device and the one or more first outputs comprise a first audible output via a hardware speaker of the automated assistant device.

7. The method of claim 1, wherein the first subset of smart devices comprise a standalone automated assistant device and the one or more first outputs comprise a first visual output via a hardware display of the automated assistant device or via a light emitting diode of the automated assistant device.

8. The method of claim 1, wherein the first subset of smart devices comprise a smart light, a smart television, or a smart thermostat.

9. The method of claim 1,
    wherein the first semantic label in the home graph is a first descriptor, of a first room within a structure, that was previously assigned to the first subset of smart devices based on first explicit user inputs; and
    wherein the second semantic label in the home graph is a second descriptor, of a second room within a structure, that was previously assigned to the second subset of smart devices based on second explicit user inputs.

10. The method of claim 1, wherein assigning the inferred semantic label to the particular area comprises:
    automatically assigning the inferred semantic label to the particular area in the map for use by the mobile robotic device.

11. The method of claim 10, further comprising, subsequent to automatically assigning the inferred semantic label to the particular area in the map for use by the mobile robotic device:
    using the inferred semantic label in controlling navigation of the mobile robotic device.

12. The method of claim 11, wherein using the inferred semantic label in controlling navigation of the mobile robotic device comprises:
    determining, based on processing a spoken input detected at one or more microphones of the mobile robotic device, that one or more terms of the spoken input match the inferred semantic label; and
    based on determining that the one or more terms match the inferred semantic label, and based on the inferred semantic label being assigned to the particular area in the map, causing the mobile robotic computing device to navigate to the particular area.

13. The method of claim 1 wherein assigning the inferred semantic label to the particular area comprises:
    suggesting, to a user in a graphical user interface, that the inferred semantic label be assigned to the particular area in the map for use by the mobile robotic device; and
    in response to receiving affirmative user interface input of the user responsive to the suggesting, assigning the inferred semantic label to the particular area in the map for use by the mobile robotic device.

14. A method implemented by one or more processors, the method comprising:
- determining, by a mobile robotic computing device and based on a map generated based at least in part on sensor observations of the mobile robotic computing device, that the mobile robotic computing device is currently located within a particular area of a structure;
- while the mobile robotic computing device is located within the particular area:
  - causing a first subset of smart devices to each emit one or more first outputs, wherein the one or more first outputs are audible and/or visual, and wherein the one or more first outputs are caused to be emitted with one or more first characteristics responsive to the first subset of smart devices each being assigned a first semantic label in a home graph;
  - causing a second subset of the smart devices to each emit one or more second outputs, wherein the one or more second outputs are audible and/or visual, and wherein the one or more second outputs are caused to be emitted with one or more second characteristics responsive to the second subset of smart device each being assigned a second semantic label in the home graph; and
  - obtaining sensor data during the emission of the one or more first outputs and the one or more second outputs, wherein the sensor data is generated by one or more sensors of the mobile robotic computing device;
- determining, based on analysis of the sensor data, that the first subset of smart devices are co-located with the mobile robotic computing device in the particular area, wherein determining that the first subset of smart devices are co-located with the mobile robotic computing device in the particular area comprises:
  - determining that a magnitude of the first characteristics in the detected output is greater than an additional magnitude of the second characteristics in the detected output; and
- in response to determining that the first subset of smart devices are co-located with the mobile robotic computing device in the particular area:
  - assigning an inferred semantic label to the particular area, the inferred semantic label being the same as, or derived from, the first semantic label assigned to the first subset of smart devices in the home graph.

15. The method of claim 14,
- wherein the first output comprises audible output and the first characteristics include a first audible frequency that is outside of the range of human hearing; and
- wherein the second output comprises audible output and the second characteristics include a second audible frequency that is outside of the range of human hearing.

16. A mobile robotic computing device comprising:
sensors;
memory storing instructions;
one or more processors operable to execute the instructions to:
- determine, based on a map generated based at least in part on sensor observations of the mobile robotic computing device, that the mobile robotic computing device is currently located within a particular area of a structure;
- while the mobile robotic computing device is located within the particular area:
  - cause a first subset of smart devices to each emit one or more first outputs, wherein the one or more first outputs are audible and/or visual, and wherein the one or more first outputs are caused to be emitted with one or more first characteristics responsive to the first subset of smart devices each being assigned a first semantic label in a home graph;
  - cause a second subset of the smart devices to each emit one or more second outputs, wherein the one or more second outputs are audible and/or visual, and wherein the one or more second outputs are caused to be emitted with one or more second characteristics responsive to the second subset of smart device each being assigned a second semantic label in the home graph; and
  - obtain sensor data during the emission of the one or more first outputs and the one or more second outputs, wherein the sensor data is generated by one or more of the sensors of the mobile robotic computing device;
- determine, based on analysis of the sensor data, that the first subset of smart devices are co-located with the mobile robotic computing device in the particular area, wherein in determining that the first subset of smart devices are co-located with the mobile robotic computing device in the particular area one or more of the processors are to:
  - determine that a magnitude, of the detected output that occurs during the first temporal window, is greater than an additional magnitude of additional detected output that occurs during the second temporal window; and
- in response to determining that the first subset of smart devices are co-located with the mobile robotic computing device in the particular area:
  - assign an inferred semantic label to the particular area, the inferred semantic label being the same as, or derived from, the first semantic label assigned to the first subset of smart devices in the home graph.

* * * * *